United States Patent
Viavattine et al.

(10) Patent No.: US 9,587,321 B2
(45) Date of Patent: Mar. 7, 2017

(54) AUXILIARY ELECTRODE FOR LITHIUM-ION BATTERY

(71) Applicant: Medtronic, Inc., Minneapolis, MN (US)

(72) Inventors: Joseph J. Viavattine, Vadnais Heights, MN (US); Gaurav Jain, Edina, MN (US); Prabhakar A. Tamirisa, Brooklyn Park, MN (US)

(73) Assignee: MEDTRONIC INC., Minneapolis, MN (US)

( * ) Notice: Subject to any disclaimer, the term of this patent is extended or adjusted under 35 U.S.C. 154(b) by 10 days.

(21) Appl. No.: 14/675,106

(22) Filed: Mar. 31, 2015

(65) Prior Publication Data

US 2015/0275384 A1     Oct. 1, 2015

Related U.S. Application Data

(62) Division of application No. 13/457,044, filed on Apr. 26, 2012, now abandoned.

(60) Provisional application No. 61/568,764, filed on Dec. 9, 2011.

(51) Int. Cl.
| | |
|---|---|
| *C25D 7/06* | (2006.01) |
| *H01M 10/0525* | (2010.01) |
| *H01M 10/058* | (2010.01) |
| *H01M 10/42* | (2006.01) |
| *H01M 4/04* | (2006.01) |
| *H01M 10/04* | (2006.01) |
| *H01M 4/02* | (2006.01) |

(52) U.S. Cl.
CPC ........ *C25D 7/0642* (2013.01); *H01M 4/0407* (2013.01); *H01M 10/0445* (2013.01); *H01M 10/058* (2013.01); *H01M 10/0525* (2013.01); *H01M 10/425* (2013.01); *H01M 10/044* (2013.01); *H01M 2004/027* (2013.01); *Y02E 60/122* (2013.01); *Y10T 29/49108* (2015.01)

(58) Field of Classification Search
None
See application file for complete search history.

(56) References Cited

U.S. PATENT DOCUMENTS

| | | |
|---|---|---|
| 3,308,306 A | 3/1967 | Bagno |
| 3,462,303 A | 8/1969 | Reber |
| 3,791,867 A | 2/1974 | Broadhead et al. |

(Continued)

FOREIGN PATENT DOCUMENTS

| | | |
|---|---|---|
| DE | 19836651 A1 | 2/2000 |
| EP | 0 732 761 A2 | 9/1996 |

(Continued)

OTHER PUBLICATIONS

SpringerMaterials, Density of LiNi0.8Co0.15Al0.05O2 (http://materials.springer.com/isp/crystallographic/docs/sd_1102446).*

(Continued)

*Primary Examiner* — Miriam Stagg
*Assistant Examiner* — Carmen Lyles-Irving
(74) *Attorney, Agent, or Firm* — Foley & Lardner LLP

(57) ABSTRACT

An auxiliary electrode for a lithium-ion battery includes a lithium source material. The auxiliary electrode is configured to selectively couple to a negative electrode of a lithium-ion battery to provide lithium for formation of a solid-electrolyte-inter-phase layer on a negative electrode.

16 Claims, 8 Drawing Sheets

(56) References Cited

U.S. PATENT DOCUMENTS

| | | |
|---|---|---|
| 3,864,167 A | 2/1975 | Broadhead et al. |
| 3,898,096 A | 8/1975 | Heredy et al. |
| 3,904,434 A * | 9/1975 | Sekido .............. H01M 10/52 429/228 |
| 4,009,052 A | 2/1977 | Whittingham |
| 4,048,397 A | 9/1977 | Rothbauer |
| 4,049,887 A | 9/1977 | Whittingham |
| 4,113,921 A | 9/1978 | Goldstein et al. |
| 4,194,062 A | 3/1980 | Carides et al. |
| 4,202,702 A | 5/1980 | Nuss |
| 4,340,652 A | 7/1982 | Raistrick et al. |
| 4,446,212 A | 5/1984 | Kaun |
| 4,464,447 A | 8/1984 | Lazzari et al. |
| 4,507,371 A | 3/1985 | Thackeray et al. |
| 4,547,442 A | 10/1985 | Besenhard et al. |
| 4,555,456 A | 11/1985 | Kanehori et al. |
| 4,581,122 A | 4/1986 | Hammond et al. |
| 4,668,595 A | 5/1987 | Yoshino et al. |
| 4,764,437 A | 8/1988 | Kaun |
| 4,830,939 A | 5/1989 | Lee et al. |
| 4,873,158 A | 10/1989 | Chang et al. |
| H723 H | 1/1990 | Plichta et al. |
| 5,053,297 A | 10/1991 | Yamahira et al. |
| 5,077,151 A | 12/1991 | Yasuda et al. |
| 5,147,737 A | 9/1992 | Post et al. |
| 5,147,739 A | 9/1992 | Beard |
| 5,160,712 A | 11/1992 | Thackeray et al. |
| 5,162,170 A | 11/1992 | Miyabayashi et al. |
| 5,162,178 A | 11/1992 | Ohsawa et al. |
| 5,169,736 A | 12/1992 | Bittihn et al. |
| 5,176,969 A | 1/1993 | Miyabayashi et al. |
| 5,187,033 A | 2/1993 | Koshiba |
| 5,187,035 A | 2/1993 | Miyabayashi et al. |
| 5,196,279 A | 3/1993 | Tarascon |
| 5,264,201 A | 11/1993 | Dahn et al. |
| 5,284,721 A | 2/1994 | Beard |
| 5,296,318 A | 3/1994 | Gozdz et al. |
| 5,300,373 A | 4/1994 | Shackle |
| 5,322,746 A | 6/1994 | Wainwright |
| 5,340,666 A | 8/1994 | Tomantschger et al. |
| 5,401,598 A | 3/1995 | Miyabayashi et al. |
| 5,411,537 A | 5/1995 | Munshi et al. |
| 5,418,090 A | 5/1995 | Koksbang et al. |
| 5,478,668 A | 12/1995 | Gozdz et al. |
| 5,498,489 A | 3/1996 | Dasgupta et al. |
| 5,510,212 A | 4/1996 | Delnick et al. |
| 5,525,441 A | 6/1996 | Reddy et al. |
| 5,545,468 A | 8/1996 | Koshiba et al. |
| 5,547,785 A | 8/1996 | Yumiba et al. |
| 5,569,553 A | 10/1996 | Smesko et al. |
| 5,576,608 A | 11/1996 | Nagai et al. |
| 5,652,072 A | 7/1997 | Lamanna et al. |
| 5,670,862 A | 9/1997 | Lewyn |
| 5,691,081 A | 11/1997 | Krause et al. |
| 5,744,258 A | 4/1998 | Bai et al. |
| 5,744,264 A | 4/1998 | Barker |
| 5,776,628 A | 7/1998 | Kraft et al. |
| 5,851,696 A | 12/1998 | Saidi et al. |
| 5,882,218 A | 3/1999 | Reimers |
| 5,888,665 A | 3/1999 | Bugga et al. |
| 5,891,592 A | 4/1999 | Mao et al. |
| 5,911,947 A | 6/1999 | Mitchell |
| 5,935,724 A | 8/1999 | Spillman et al. |
| 5,935,728 A | 8/1999 | Spillman et al. |
| 5,968,681 A | 10/1999 | Miura et al. |
| 6,001,139 A | 12/1999 | Asanuma et al. |
| 6,001,507 A | 12/1999 | Ono et al. |
| 6,007,947 A | 12/1999 | Mayer |
| 6,022,643 A | 2/2000 | Lee et al. |
| 6,025,093 A | 2/2000 | Herr |
| 6,060,186 A | 5/2000 | Broussely |
| 6,067,474 A | 5/2000 | Schulman et al. |
| 6,120,938 A | 9/2000 | Atsumi et al. |
| 6,139,815 A | 10/2000 | Atsumi et al. |
| 6,157,706 A | 12/2000 | Rachelson |
| 6,165,638 A | 12/2000 | Spillman et al. |
| 6,165,646 A | 12/2000 | Takada et al. |
| 6,171,729 B1 | 1/2001 | Gan et al. |
| 6,203,947 B1 | 3/2001 | Peled et al. |
| 6,203,994 B1 | 3/2001 | Epps et al. |
| 6,207,327 B1 | 3/2001 | Takada et al. |
| 6,221,531 B1 | 4/2001 | Vaughey et al. |
| 6,228,536 B1 | 5/2001 | Wasynczuk |
| 6,258,473 B1 | 7/2001 | Spillman et al. |
| 6,265,100 B1 | 7/2001 | Saaski et al. |
| 6,274,271 B1 | 8/2001 | Koshiba et al. |
| 6,287,721 B1 | 9/2001 | Xie et al. |
| 6,316,145 B1 | 11/2001 | Kida et al. |
| 6,335,115 B1 | 1/2002 | Meissner |
| 6,352,798 B1 | 3/2002 | Lee et al. |
| 6,365,301 B1 | 4/2002 | Michot et al. |
| 6,372,384 B1 | 4/2002 | Fujimoto et al. |
| 6,379,841 B1 | 4/2002 | Potanin et al. |
| 6,379,842 B1 | 4/2002 | Mayer |
| 6,451,480 B1 | 9/2002 | Gustafson et al. |
| 6,453,198 B1 | 9/2002 | Torgerson et al. |
| 6,461,751 B1 | 10/2002 | Boehm et al. |
| 6,461,757 B1 | 10/2002 | Sasayama et al. |
| 6,475,673 B1 | 11/2002 | Yamawaki et al. |
| 6,489,062 B1 | 12/2002 | Watanabe et al. |
| 6,503,662 B1 | 1/2003 | Hamamoto et al. |
| 6,528,208 B1 | 3/2003 | Thackeray et al. |
| 6,553,263 B1 | 4/2003 | Meadows et al. |
| 6,596,439 B1 | 7/2003 | Tsukamoto et al. |
| 6,603,146 B1 | 8/2003 | Hata et al. |
| 6,605,382 B2 | 8/2003 | Ruth et al. |
| 6,641,953 B2 | 11/2003 | Takeuchi et al. |
| 6,645,670 B2 | 11/2003 | Gan |
| 6,645,675 B1 | 11/2003 | Munshi |
| 6,670,071 B2 | 12/2003 | Skinlo et al. |
| 6,673,493 B2 | 1/2004 | Gan et al. |
| 6,677,083 B2 | 1/2004 | Suzuki et al. |
| 6,706,445 B2 | 3/2004 | Barker et al. |
| 6,720,110 B2 | 4/2004 | Barker et al. |
| 6,720,112 B2 | 4/2004 | Barker et al. |
| 6,730,437 B2 | 5/2004 | Leising et al. |
| 6,732,384 B2 | 5/2004 | Scott |
| 6,737,191 B2 | 5/2004 | Gan et al. |
| 6,759,168 B2 | 7/2004 | Yamasaki et al. |
| 6,761,744 B1 | 7/2004 | Tsukamoto et al. |
| 6,777,132 B2 | 8/2004 | Barker et al. |
| 6,824,920 B1 | 11/2004 | Iwamoto et al. |
| 6,841,304 B2 | 1/2005 | Michot et al. |
| 6,849,360 B2 | 2/2005 | Marple |
| 6,869,724 B2 | 3/2005 | Suzuki et al. |
| 6,905,795 B2 | 6/2005 | Jung et al. |
| 6,905,796 B2 | 6/2005 | Ishida et al. |
| 6,908,711 B2 | 6/2005 | Fauteux et al. |
| 6,942,949 B2 | 9/2005 | Besenhard et al. |
| 6,946,218 B2 | 9/2005 | Crouch et al. |
| 6,951,576 B1 | 10/2005 | Takeuchi |
| 7,018,743 B2 | 3/2006 | Guidi et al. |
| 7,029,793 B2 | 4/2006 | Nakagawa et al. |
| 7,101,642 B2 | 9/2006 | Tsukamoto et al. |
| 7,157,185 B2 | 1/2007 | Marple |
| 7,177,691 B2 | 2/2007 | Meadows et al. |
| 7,184,836 B1 | 2/2007 | Meadows et al. |
| 7,189,475 B2 | 3/2007 | Sasaki et al. |
| 7,191,008 B2 | 3/2007 | Schmidt et al. |
| 7,195,844 B2 | 3/2007 | Suzuki et al. |
| 7,202,000 B2 | 4/2007 | Iriyama et al. |
| 7,207,415 B2 | 4/2007 | McGehee |
| 7,211,350 B2 | 5/2007 | Amatucci |
| 7,238,449 B2 | 7/2007 | Suzuki et al. |
| 7,337,010 B2 | 2/2008 | Howard et al. |
| 7,341,803 B2 | 3/2008 | Huang et al. |
| 7,392,117 B1 | 6/2008 | Bilodeau et al. |
| 7,435,492 B2 | 10/2008 | Ovshinsky et al. |
| 7,459,235 B2 | 12/2008 | Choi et al. |
| 7,462,425 B2 | 12/2008 | Takami et al. |
| 7,488,553 B2 | 2/2009 | Tsukamoto et al. |
| 7,524,580 B1 | 4/2009 | Birke et al. |
| 7,541,114 B2 | 6/2009 | Ohzuku et al. |
| 7,563,541 B2 | 7/2009 | Howard et al. |

(56) References Cited

U.S. PATENT DOCUMENTS

| | | |
|---|---|---|
| 7,582,380 B1 | 9/2009 | Dunstan et al. |
| 7,582,387 B2 | 9/2009 | Howard et al. |
| 7,632,603 B2 | 12/2009 | Tsukamoto et al. |
| 7,635,541 B2 | 12/2009 | Scott et al. |
| 7,641,992 B2 | 1/2010 | Howard et al. |
| 7,642,013 B2 | 1/2010 | Howard et al. |
| 7,662,509 B2 | 2/2010 | Howard et al. |
| 7,662,515 B2 | 2/2010 | Inagaki et al. |
| 7,682,745 B2 | 3/2010 | Howard et al. |
| 7,740,985 B2 | 6/2010 | Howard et al. |
| 7,794,869 B2 | 9/2010 | Howard et al. |
| 7,799,470 B2 | 9/2010 | Cho et al. |
| 7,803,481 B2 | 9/2010 | Howard et al. |
| 7,807,299 B2 | 10/2010 | Howard et al. |
| 7,811,703 B2 | 10/2010 | Fujita et al. |
| 7,811,705 B2 | 10/2010 | Scott et al. |
| 7,818,068 B2 | 10/2010 | Meadows et al. |
| 7,858,236 B2 | 12/2010 | Howard et al. |
| 7,875,389 B2 | 1/2011 | Scott et al. |
| 7,879,495 B2 | 2/2011 | Howard et al. |
| 7,883,790 B2 | 2/2011 | Howard et al. |
| 7,927,742 B2 | 4/2011 | Scott et al. |
| 7,931,987 B2 | 4/2011 | Howard et al. |
| 8,178,242 B2 | 5/2012 | Howard et al. |
| 2001/0008725 A1 | 7/2001 | Howard |
| 2001/0012590 A1 | 8/2001 | Ehrlich |
| 2001/0021472 A1 | 9/2001 | Barker et al. |
| 2001/0031401 A1 | 10/2001 | Yamawaki et al. |
| 2003/0025482 A1 | 2/2003 | Tsukamoto et al. |
| 2003/0104282 A1 | 6/2003 | Xing et al. |
| 2003/0124423 A1 | 7/2003 | Sasaki et al. |
| 2003/0129485 A1 | 7/2003 | Guidi et al. |
| 2003/0157410 A1 | 8/2003 | Jarvis et al. |
| 2003/0190531 A1 | 10/2003 | Otsuki et al. |
| 2003/0215716 A1 | 11/2003 | Suzuki et al. |
| 2004/0002005 A1 | 1/2004 | Gao et al. |
| 2004/0023117 A1 | 2/2004 | Imachi et al. |
| 2004/0029156 A1 | 2/2004 | Matson et al. |
| 2004/0062989 A1 | 4/2004 | Ueno et al. |
| 2004/0072072 A1 | 4/2004 | Suzuki et al. |
| 2004/0096745 A1 | 5/2004 | Shibano et al. |
| 2004/0147971 A1 | 7/2004 | Greatbatch et al. |
| 2004/0147972 A1 | 7/2004 | Greatbatch et al. |
| 2004/0158296 A1 | 8/2004 | Greatbatch et al. |
| 2004/0168307 A1 | 9/2004 | Hong |
| 2004/0176818 A1 | 9/2004 | Wahlstrand et al. |
| 2004/0197657 A1 | 10/2004 | Spitler et al. |
| 2004/0209156 A1 | 10/2004 | Ren et al. |
| 2005/0031919 A1 | 2/2005 | Ovshinsky et al. |
| 2005/0069777 A1 | 3/2005 | Takami et al. |
| 2005/0130043 A1 | 6/2005 | Gao et al. |
| 2005/0147889 A1 | 7/2005 | Ohzuku et al. |
| 2005/0164082 A1 | 7/2005 | Kishi et al. |
| 2005/0244716 A1 | 11/2005 | Ogawa et al. |
| 2006/0024582 A1 | 2/2006 | Li et al. |
| 2006/0046149 A1 | 3/2006 | Yong et al. |
| 2006/0068282 A1 | 3/2006 | Kishi et al. |
| 2006/0090962 A1 | 5/2006 | McGehee |
| 2006/0091572 A1 | 5/2006 | Santra et al. |
| 2006/0093871 A1 | 5/2006 | Howard et al. |
| 2006/0093872 A1 | 5/2006 | Howard et al. |
| 2006/0093873 A1 | 5/2006 | Howard et al. |
| 2006/0093894 A1 | 5/2006 | Scott et al. |
| 2006/0093913 A1 | 5/2006 | Howard et al. |
| 2006/0093916 A1 | 5/2006 | Howard et al. |
| 2006/0093917 A1 | 5/2006 | Howard et al. |
| 2006/0093918 A1 | 5/2006 | Howard et al. |
| 2006/0093921 A1 | 5/2006 | Scott et al. |
| 2006/0093923 A1 | 5/2006 | Howard et al. |
| 2006/0095094 A1 | 5/2006 | Howard et al. |
| 2006/0216612 A1 | 9/2006 | Jambunathan et al. |
| 2006/0234125 A1 | 10/2006 | Valle |
| 2006/0243598 A1 | 11/2006 | Singh et al. |
| 2006/0251968 A1 | 11/2006 | Tsukamoto et al. |
| 2007/0009801 A1 | 1/2007 | Inagaki et al. |
| 2007/0059587 A1 | 3/2007 | Kishi et al. |
| 2007/0072085 A1 | 3/2007 | Chen et al. |
| 2007/0077496 A1 | 4/2007 | Scott et al. |
| 2007/0111099 A1 | 5/2007 | Nanjundaswamy et al. |
| 2007/0134556 A1 | 6/2007 | Sano et al. |
| 2007/0135662 A1 | 6/2007 | Nardello et al. |
| 2007/0162083 A1 | 7/2007 | Schmidt et al. |
| 2007/0233195 A1 | 10/2007 | Wahlstrand et al. |
| 2007/0239221 A1 | 10/2007 | Kast et al. |
| 2007/0248881 A1 | 10/2007 | Scott et al. |
| 2007/0284159 A1 | 12/2007 | Takami et al. |
| 2008/0002626 A1 | 1/2008 | Yokoyama |
| 2008/0020278 A1 | 1/2008 | Schmidt et al. |
| 2008/0020279 A1 | 1/2008 | Schmidt et al. |
| 2008/0026297 A1 | 1/2008 | Chen et al. |
| 2008/0044728 A1 | 2/2008 | Schmidt et al. |
| 2008/0176142 A1 | 7/2008 | Inagaki et al. |
| 2008/0241689 A1 | 10/2008 | Takami et al. |
| 2009/0035662 A1 | 2/2009 | Scott et al. |
| 2009/0075166 A1 | 3/2009 | Takami et al. |
| 2009/0208834 A1* | 8/2009 | Ramasubramanian . H01M 4/13 429/149 |
| 2009/0208845 A1 | 8/2009 | Howard et al. |
| 2009/0274849 A1 | 11/2009 | Scott et al. |
| 2009/0286151 A1 | 11/2009 | Scott et al. |
| 2010/0076523 A1 | 3/2010 | Howard et al. |
| 2010/0239908 A1 | 9/2010 | Howard et al. |
| 2010/0279155 A1 | 11/2010 | Scott et al. |
| 2010/0316898 A1 | 12/2010 | Howard et al. |
| 2011/0133699 A1 | 6/2011 | Howard et al. |
| 2011/0183210 A1 | 7/2011 | Howard et al. |
| 2011/0281148 A1 | 11/2011 | Scott et al. |
| 2012/0045670 A1* | 2/2012 | Stefan ............... H01M 4/0421 429/61 |

FOREIGN PATENT DOCUMENTS

| | | |
|---|---|---|
| EP | 0 982 790 A1 | 3/2000 |
| EP | 1 014 465 A1 | 6/2000 |
| EP | 1 018 773 A1 | 7/2000 |
| EP | 1 069 635 A1 | 1/2001 |
| EP | 0 567 149 B1 | 11/2001 |
| EP | 1 267 111 A1 | 12/2002 |
| EP | 1 282 180 A1 | 2/2003 |
| EP | 1 487 039 A1 | 12/2004 |
| EP | 1 722 439 A1 | 11/2006 |
| JP | 56136462 | 10/1981 |
| JP | 57011476 | 1/1982 |
| JP | 57152669 | 9/1982 |
| JP | 02309568 | 12/1990 |
| JP | H05-166538 | 7/1993 |
| JP | 06275263 | 9/1994 |
| JP | 1027626 | 1/1998 |
| JP | 2000156229 | 6/2000 |
| JP | 2000195499 | 7/2000 |
| JP | 2001126756 | 5/2001 |
| JP | 2001185141 A | 7/2001 |
| JP | 2002-042889 | 2/2002 |
| JP | 2002-151154 | 5/2002 |
| WO | WO97/06569 A1 | 2/1997 |
| WO | WO97/48141 A1 | 12/1997 |
| WO | WO00/17950 A1 | 3/2000 |
| WO | WO0133656 A1 | 5/2001 |
| WO | WO02/09215 A2 | 1/2002 |
| WO | WO02/21628 A1 | 3/2002 |
| WO | WO02/39524 A1 | 5/2002 |
| WO | WO02/069414 A2 | 9/2002 |
| WO | WO02/095845 A1 | 11/2002 |
| WO | WO03/044880 A1 | 5/2003 |
| WO | WO03/075371 A2 | 9/2003 |
| WO | WO03/075376 A1 | 9/2003 |
| WO | WO03/090293 A2 | 10/2003 |
| WO | WO 2006/050022 A2 | 5/2006 |
| WO | WO 2006/050023 A2 | 5/2006 |
| WO | WO 2006/050098 A1 | 5/2006 |
| WO | WO 2006/050099 A1 | 5/2006 |
| WO | WO 2006/050100 A2 | 5/2006 |

(56) References Cited

FOREIGN PATENT DOCUMENTS

WO     WO 2006/050117 A2     5/2006
WO     WO 2006/064344 A2     6/2006

OTHER PUBLICATIONS

Springer Materials, Density of $LiMn_2O_4$ (http://materials.springer.com/isp/crystallographic/docs/sd_1102446).*
U.S. Appl. No. 12/869,653, filed Aug. 26, 2010, Howard et al.
U.S. Appl. No. 13/192,264, filed Jul. 27, 2011, Jain Gaurav.
U.S. Appl. No. 13/231,408, filed Sep. 13, 2011, Howard et al.
Advisory Action for U.S. Appl. No. 12/869,653, mail date Aug. 26, 2010, 3 pages.
Advisory Action for U.S. Appl. No. 13/231,408, mail date Sep. 13, 2011, 3 pages.
Amendment and Reply for U.S. Appl. No. 12/869,653, mail date Nov. 18, 2010, 20 pages.
Amendment and Reply for U.S. Appl. No. 12/869,653, mail date Mar. 28, 2011, 24 pages.
Amendment and Reply for U.S. Appl. No. 12/869,653, mail date Sep. 6, 2011, 21 pages.
Amendment and Reply for U.S. Appl. No. 12/869,653, mail date Dec. 19, 2011, 13 pages.
Amendment and Reply for U.S. Appl. No. 13/231,408, mail date Aug. 14, 2011, 14 pages.
Amendment and Reply for U.S. Appl. No. 13/231,408, mail date Apr. 20, 2012, 19 pages.
Amendment and Reply for U.S. Appl. No. 13/231,408, mail date Aug. 1, 2011, 15 pages.
Ariyoshi et al., Three-Volt Lithium-Ion Battery with $Li[Ni1/2Mn3/2]O_4$ and the Zero-Strain Insertion Material of $Li[Li1/3Ti5/3]O_4$, Journal of Power Sources, 2003, 5 pages.
Battery Materials, Ceramic Anode Material for 2.4 V Lithium-Ion Batteries, Oct. 25, 2004, 1 page.
Belharouak et al., On the Safety of the $Li_4Ti_5O_{12}/LiMn_2O_4$ Lithium-Ion Battery System, Journal of the Electrochemical Society, vol. 154, 2007, 5 pages.
Brohan et al., Properties Physiques Des Bronzes $MxTiO_2(B)$, Solid State Ionics, 1983, 6 pages.
Cava et al., The Crystal Structures of the Lithium-Inserted Metal Oxides $Li0.5TiO_2$ Anatase, $LiTi_2O_4$ Spinel, and $Li_2Ti_2O_4$, Journal of Solid State Chemistry, vol. 53, 1984, 12 pages.
Christensen et al., Optimization of Lithium Titanate Electrodes for High-Power Cells, (ECS) Journal of the Electrochemical Society, vol. 153, 2006, 6 pages.
Colbow et al., Structure and Electrochemistry of the Spinel Oxides $LiTi_2O_4$ and $Li_{4/3}Ti_{5/3}O_4$, Journal of Power Sources 26, 1989, 6 pages.
Dahn et al., Combinatorial Study of $Sn1-xCox$ ($0<x<0.6$) and $[Sn0.55Co0.45]1-yCy$ ($0<y<0.5$) Alloy Negative Electrode Materials for Li-Ion Batteries, Journal of Electrochemical Society, vol. 153, 2006, 5 pages.
Fauteux et al., Rechargeable Lithium Battery Anodes: Alternatives to Metallic Lithium, Journal of Applied Electrochemistry, vol. 23, 1993, 10 pages.
Ferg et al., Spinel Anodes for Lithium-Ion Batteries, J. Electrochem. Soc. 141, Nov. 1994, 4 pages.
FMC Lithium, CAS No. 74389-93-2, Stabilized Lithium Metal Powder, Product Specification, 2001, 2 pages.
Guerfi et al., Nano Electronically Conductive Titanium-Spinel as Lithium Ion Storage Negative Electrode, Journal of Power Sources, 2004, 6 pages.
Guyomard et al., New Amorphous Oxides as High Capacity Negative Electrodes for Lithium 6 Batteries the $LixMV0_4$ (M=Ni, Co, Cd, Zn; $1<x<8$) Series, Journal of Power Sources 68, 1997, 6 pages.
International Search Report and Written Opinion for Application No. PCT/US2008/066803, mail date Oct. 7, 2008, 12 pages.
International Search Report and Written Opinion Application No. PCT/US2012/068509, mail date Mar. 11, 2013.
International Search Report and Written Opinion for Application No. PCT/US2008/066801, mail date Oct. 29, 2008, 10 pages.
International Search Report and Written Opinion for Application No. PCT/US2008/066809, mail date Oct. 29, 2008, 8 pages.
International Search Report and Written Opinion for Application No. PCT/US2008/082598, mail date Feb. 18, 2009, 11 pages.
International Search Report and Written Opinion for Application No. PCT/US2012/048286, mail date Nov. 5, 2012, 13 pages.
International Search Report for Application No. PCT/US2005/038761, mail date Oct. 4, 2006, 2 pages.
International Search Report for Application No. PCT/US2005/038762, mail date Oct. 2, 2005, 2 pages.
International Search Report for Application No. PCT/US2005/038942, mail date Mar. 2, 2006, 3 pages.
International Search Report for Application No. PCT/US2005/038943, mail date Mar. 16, 2006, 3 pages.
International Search Report for Application No. PCT/US2005/038944, mail date Mar. 31, 2006, 3 pages.
International Search Report for Application No. PCT/US2005/038970, mail date, Oct. 25, 2006, 3 pages.
Jansen et al., Development of a High-Power Lithium-Ion Battery, Journal of Power Sources, 81-82, 1999, 4 pages.
Jarvis et al., A Li-Ion Cell Containing a Non-Lithiated Cathode, Abs. 182, IMLB 12 Meeting, 2004, 1 page.
Kavan et al., Proof of Concept-$Li_4Ti_5O_{12}$, Electrochemical and Solid State Letters, 2002, vol. 5, 1 page.
Linden, Handbook of Batteries, 1995, 6 pages.
Medtronic Activa® Product Family and Procedure Solution Product Specifications, 2003, 6 pages.
Medtronic Neurostimulation Systems Product Brochure, 2002, 6 pages.
Mikula et al., Photoelectrochemical Properties of Anodic $TiO_2$ Layers Prepared by Various Current Densities, J. Electrochemical Society, vol. 139, Dec. 1992, 5 pages.
Murphy et al., Lithium Insertion in Anatase: A New Route to the Spinel $LiTi_2O_4$, Revue De Chimie Minerale, vol. 19, 1982, 5 pages.
Murphy et al., Ternary $LixTiO_2$ Phases from Insertion Reactions, Solid State Ionics, vols. 9-10, 1983, 5 pages.
Murphy et al., Topochemical Reactions of Rutile Related Structures with Lithium, Mat. Res. Bull, vol. 13, 8 pages.
Nakahara et al., Preparation of Particulate $Li_4Ti_5O_{12}$ Having Excellent Characteristics as an Electrode Active Material for Power Storage Cells, Journal of Power Sources, 2003, 6 pages.
New $Li_4Ti_5O_{12}$ Anode Material of Süd-Chemie AG for Lithium Ion Batteries, Süd-Chemie EXM 1037-$Li_4Ti_5O_{12}$, Product Specification, 2 pages.
Observations by a Third Party Concerning Patentability of European Application No. 08770913.5 (submitted by third party to EPO on Jan. 26, 2013; Transmittal of third party observations mailed by EPO to applicant on Feb. 7, 2013)—21 pages.
Office Action for U.S. Appl. No. 12/869,653 mail date Aug. 26, 2010, 17 pages.
Office Action for U.S. Appl. No. 13/081,050, mail date May 13, 2011, 7 pages.
Office Action for U.S. Appl. No. 13/081,050, mail date Oct. 14, 2011, 8 pages.
Office Action for U.S. Appl. No. 13/231,408, mail date Sep. 13, 2011, 8 pages.
Ohzuku et al., Lithium-Ion Batteries of $Li[Li1/3Ti5/3]O_4$ With Selected Positive-Electrode Materials for Long-Life Power Application, Abs. 23, IMLB 12 Meeting, 2004, 1 page.
Ohzuku et al., Why Transition Metal (Di)oxides are the Most Attractive Materials for Batteries, Solid State Ionics, vol. 69, 1994, 11 pages.
Ohzuku et al., Zero-Strain Insertion Material of $Li[Li1/3Ti5/3]O_4$ for Rechargeable Lithium Cells, J. Electrochem. Soc., vol. 142, 1995, 5 pages.
Ohzuku, Extended Abstracts from the Seventh Int'l Meeting on Li Batteries, May 15-20, 1994, 3 pages.
Peramunage et al., Preparation of Micro-Sized $Li_4Ti_5O_{12}$ and Its Electrochemistry in Polyacrylonitrile Electrolye-Based Lithium Cells, Technical Papers, Electrochemical Science and Technology, J. Electrochem Soc., vol. 145, Aug. 1998, 8 pages.

(56) References Cited

OTHER PUBLICATIONS

Poizot et al., Nano-Sized Transition-Metal Oxides as Negative-Electrode Materials for Lithium-Ion Batteries, Nature, vol. 407, 2000, 5 pages.
Prosini et al., Li4Ti5O12 as Anode in All-Solid-State, Plastic, Lithium-Ion Batteries for Low-Power Applications, Solid State Ionics, 2001, 8 pages.
Request for Continue Examination for U.S. Appl. No. 12/869,653, mail date Jan. 18, 2012, 23 pages.
Request for Continued Examination for U.S. Appl. No. 13/231,408, mail date Aug. 14, 2012, 15 pages.
Restriction Requirement for U.S. Appl. No. 12/869,653, mail date Aug. 26, 2010, 8 pages.
Sasaki et al., Layered Hydrous Titanium Dioxide: Potassium Ion Exchange and Structural Characterization, Inorganic Chemistry, 4 pages.
Sawai et al., Factors Affecting Rate Capability of a Lithium-ion Battery with Li[Li1/3Ti5/3]O4 and LiCo1/2Ni1/2O2, Abs. 75, 2004, 3 pages.
Scrosati, Low Voltage Lithium-Ion Cells, Advances in Lithium-Ion Batteries, 21 pages.
Singhal et al., Nanostructured Electrodes for Next Generation Rechargeable Electrochemical Devices, Journal of Power Sources, 2004, 7 pages.
Sun et al., The Compatibility of a Boron-Based Anion Receptor with the Carbon Anode in Lithium-Ion Batteries, Electrochemical and Solid-State Letters, 2003, 4 pages.
Sun et al., Using a Boron-Based Anion Receptor Additive to Improve the Thermal Stability of LiPF6-Based Electrolyte for Lithium Batteries, (ECS) Electrochemical and Solid-State Letters, 2002, 4 pages.
Trifonova et al., Sn—Sb and Sn Bi Alloys as Anode Materials for Lithium-Ion Batteries, Ionics, vol. 8, 2002, 9 pages.
Wang et al., Li Insertion and Ion Exchange Reactions in the Ionic Conducting Tl2(M,Ti)8O16 Phases with Hollandite-Type Structure, J. Electrochem Soc., vol. 38, Jan. 1991, 7 pages.
Wang et al., Novel Electrolytes for Nanocrystalline Li4Ti5O12 Based High Power Lithium Ion Batteries, 1 page.
Winter et al., Electrochemical Lithiation of Tin and Tin Based Intermetallics and Composites, Electrochimica Acta, vol. 45, 1999, 10 pages.
Winter et al., Insertion Electrode Materials for Rechargeable Lithium Batteries, Advanced Materials, vol. 10, 1998, 38 pages.
XKnife™ RT, Integra Radionics, www.radionics.com, Jul. 10, 2006, 2 pages.
Zaghib et al., Electrochemical Study of Li4Ti5O12 as Negative Electrode for Li-Ion Polymer Rechargeable Batteries, Journal of Power Sources, 81-82, 1999, 6 pages.

* cited by examiner

AUXILIARY ELECTRODE FOR LITHIUM-ION BATTERY

CROSS-REFERENCE TO RELATED PATENT APPLICATIONS

This application is a divisional of U.S. patent application Ser. No. 13/457,044, filed Apr. 26, 2012, which claims priority to and the benefit of U.S. Provisional Application No. 61/568,764, filed Dec. 9, 2011, the disclosures of which are incorporated herein by reference in their entirety.

BACKGROUND

The present application relates generally to the field of lithium-ion batteries or cells. More particularly, the present application relates to improved solid-electrolyte inter-phase ("SEI") layer formation on a negative electrode of a lithium-ion battery.

Lithium-ion batteries or cells include one or more positive electrodes, one or more negative electrodes, and an electrolyte provided within a case or housing. Separators made from a porous polymer or other suitable material may also be provided intermediate or between the positive and negative electrodes to prevent direct contact between adjacent electrodes. The positive electrode includes a current collector having an active material provided thereon, and the negative electrode includes a current collector having an active material provided thereon. The active materials for the positive and negative electrodes may be provided on one or both sides of the current collectors.

FIG. 1 shows a schematic representation of a portion of a lithium-ion battery 1 such as that described above. The battery 1 includes a positive electrode 10 that includes a positive current collector 12 and a positive active material 16, a negative electrode 20 that includes a negative current collector 22 and a negative active material 24, an electrolyte material 40, and a separator (e.g., a polymeric microporous separator, not shown) provided intermediate or between the positive electrode 10 and the negative electrode 20. The electrodes 10, 20 may be provided as relatively flat or planar plates or may be wrapped or wound in a spiral or other configuration (e.g., an oval configuration). The electrodes may also be provided in a folded (e.g., a zig-zag, accordion, or z-fold) configuration.

During charging and discharging of the battery 1, lithium ions move between the positive electrode 10 and the negative electrode 20. For example, when the battery 1 is discharged, lithium ions flow from the negative electrode 20 to the positive electrode 10. In contrast, when the battery 1 is charged, lithium ions flow from the positive electrode 10 to the negative electrode 20.

Once assembly of the battery is complete, an initial charging operation (referred to as a "formation process") may be performed. During this process, one goal is to form a stable solid-electrolyte-inter-phase (SEI) layer at the negative electrode and also possibly at the positive electrode. These SEI layers are formed through a process of irreversible reactions between the electrodes and the electrolyte (e.g., with decomposing solvents of the electrolyte). Beneficially, these SEI layers act to passivate the electrode-electrolyte interfaces as well as to prevent side-reactions thereafter, thereby increasing battery stability.

However, there may also be several downsides associated with SEI layers. For example, SEI layers are formed with lithium that would otherwise be cyclable. Thus, to achieve a desired capacity or cell balance (i.e., balance between capacity of the positive electrode to absorb lithium), additional positive active material would be required, which could increase cost, increase weight, and decrease power density of the battery. The SEI layers also have insulating properties that may result in impedance or resistance within the battery, which can negatively impact the charge and discharge characteristics of the battery. The SEI layers may also continue to grow in thickness over the course of a battery's life, which further removes cyclable lithium from the battery, thus decreasing capacity and increasing resistance or impedance. The SEI layer may also degrade over the life of the battery, such as when the electrode shrinks and expands due to heat associated with charging or discharging, which may cause cracks or other irregularities may form in the SEI layer. At the location of these irregularities, new SEI will be formed by a reaction that further reduces the amount of cyclable lithium.

One possible manner to address the problems associated with degradation of the SEI layer is to initially create thicker, more robust SEI layer. However, this would require more lithium at formation, which would either reduce battery capacity or require additional positive active material as described above. Further, as the amount of lithium required to form a thicker SEI at the negative increases, the voltage of the positive active material must be increased to deliver the lithium. This may, in some circumstances, affect overall stability of the positive electrode and related cell components due to parasitic reactions occurring at higher voltages, which may lead to capacity fade and impedance increase. Also, because SEI formation is known to best occur in a slow, controlled process, a thicker SEI layer would require a longer manufacturing or formation time.

Accordingly, it would be advantageous to provide a lithium ion battery with improved SEI formation.

SUMMARY

According to an exemplary embodiment, an auxiliary electrode for a lithium-ion battery includes a lithium source material. The auxiliary electrode is configured to selectively couple to a negative electrode of a lithium-ion battery to provide lithium for formation of a solid-electrolyte-inter-phase layer.

According to an exemplary embodiment, an lithium-ion battery includes a negative electrode, a positive electrode, and an auxiliary electrode. The auxiliary electrode includes a lithium source material. The auxiliary electrode is configured to selectively couple to the negative electrode to provide lithium for formation of a solid-electrolyte-inter-phase layer on the negative electrode.

According to an exemplary embodiment, a method is provided for forming a solid-electrolyte-inter-phase layer on a negative electrode of a lithium-ion battery. The method includes providing a lithium-ion battery having a positive electrode, a negative electrode, and an auxiliary electrode having a lithium source material, wherein the electrodes are in contact with a common electrolyte. The method includes charging the battery by coupling the positive electrode to the negative electrode with a voltage source, such that lithium from the positive electrode forms at least a portion of a solid-electrolyte-inter-phase layer on the negative electrode. The method also includes coupling the auxiliary electrode to the negative electrode, such that lithium from the auxiliary electrode forms another portion of the solid-electrolyte-inter-phase layer on the negative electrode.

DETAILED DESCRIPTION

According to an exemplary embodiment, a lithium-ion battery includes a positive electrode having a positive active material, a negative electrode having a negative active material, and an auxiliary electrode having a lithium source material. The auxiliary electrode is configured to selectively couple to the negative electrode to supply lithium for formation of an SEI layer on the negative electrode. By providing lithium from a source separate from the positive active material, the lithium-ion battery may, for example, have lower resistance, higher power density, and/or higher maintained capacity than a conventional lithium ion battery without the auxiliary electrode. These advantages may be accomplished, for example, by forming an SEI layer on the negative electrode in a controlled manner at various stages during the life cycle of the lithium-ion battery.

Use of the auxiliary electrode may be particularly advantageous for those batteries having negative electrodes that, for example, consume relatively significant amounts of lithium in forming the SEI layer (e.g., lithium-ion batteries where irreversible capacity created during formation of the battery amounts to approximately 10% total cell capacity) by providing for improved cell energy density, capacity fade, and impedance rise.

Use of the auxiliary electrode may also be advantageous for batteries having negative electrodes that are particularly susceptible to formation of irregularities or relatively significant expansion/contraction during charge and discharge, such as those incorporating silicon alloys or other materials as described herein. For example, the auxiliary electrode may be used to initially form a stable SEI on the negative electrode in combination with the positive electrode. After subsequent charging/discharging, the auxiliary electrode may be coupled to the negative electrode to "repair" the SEI so as to extend the useful lifetime of the battery without reducing cyclable lithium (i.e., capacity).

Figure 1:
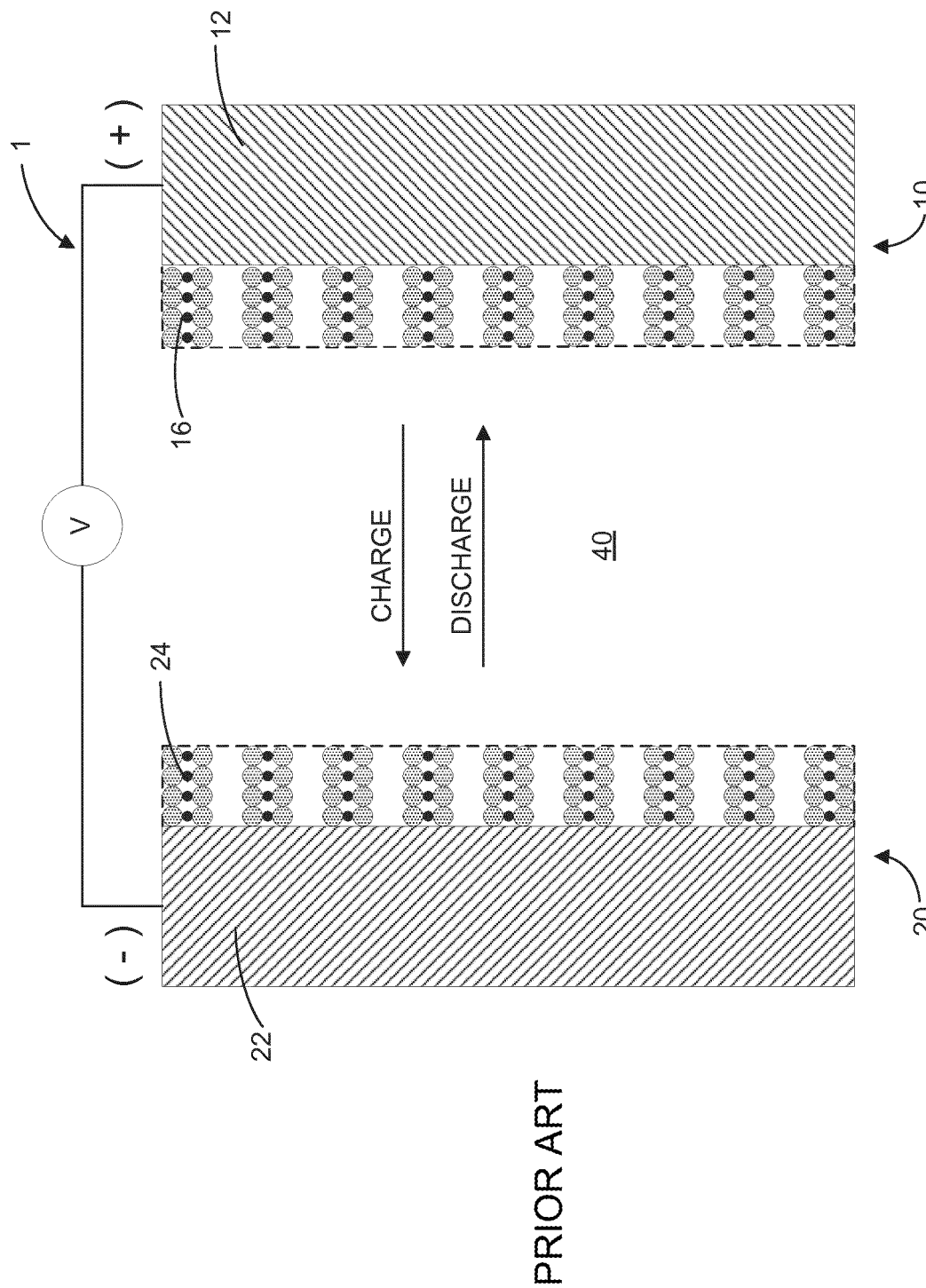
FIG. 1 is a schematic view of a conventional lithium-ion battery.
Figure 2:
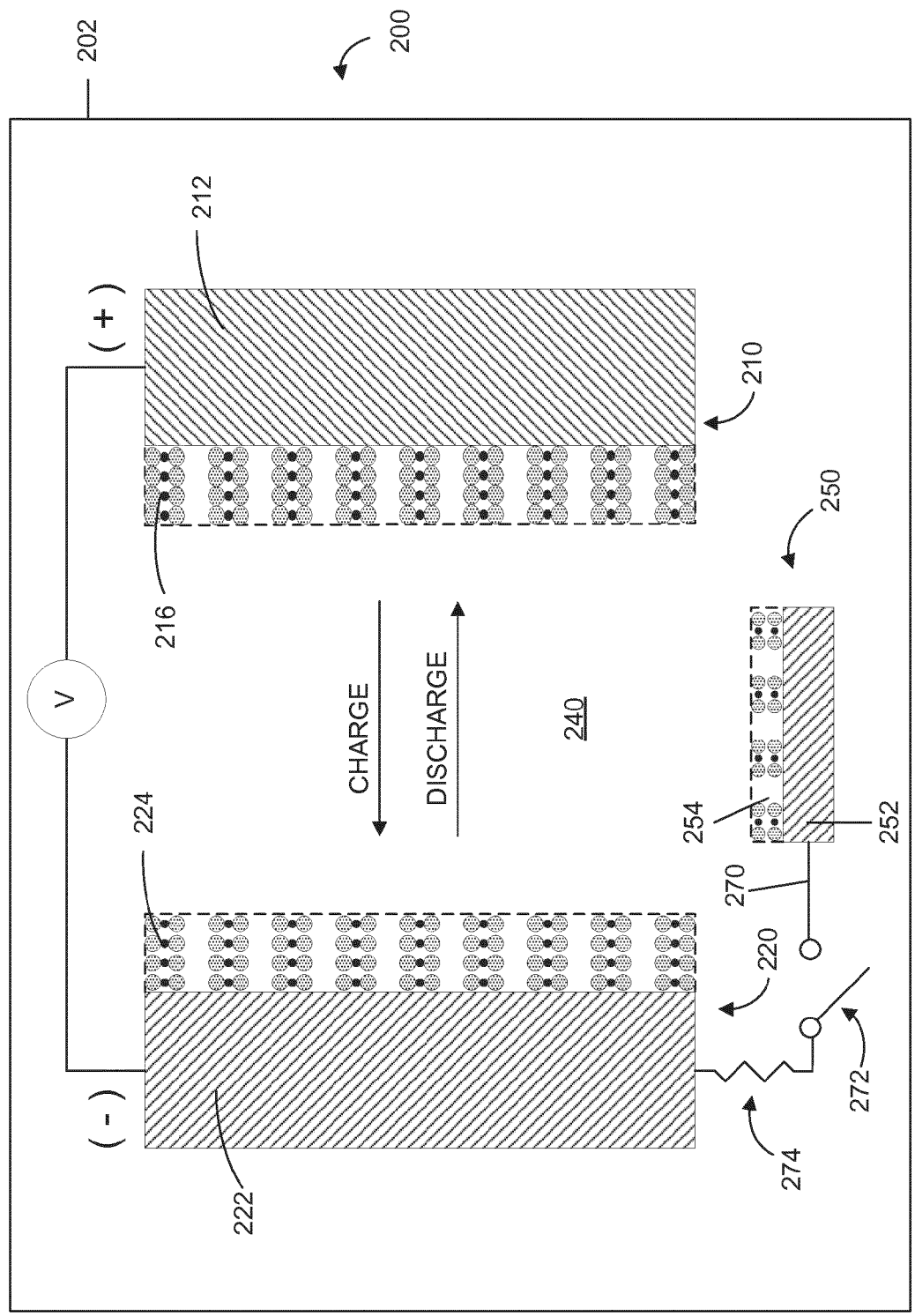
FIG. 2 is a schematic view of a lithium-ion battery according to an exemplary embodiment.

FIG. 2 is a schematic cross-sectional view of a portion of a battery 200 according to an exemplary embodiment that includes a case 202, an electrolyte 240, at least one positive electrode 210, at least one negative electrode 220, and an auxiliary electrode 250. The size, shape, and configuration of the battery may be selected based on the desired application or other considerations. For example the electrodes may be flat plate electrodes, wound electrodes, or folded electrodes (e.g., Z-fold electrodes). According to other exemplary embodiments, the battery may be a button cell battery, a thin film solid state battery, or another type of lithium-ion battery.

According to an exemplary embodiment, the battery 200 has a rating of between approximately 1 and 1000 milliampere hours (mAh). According to another exemplary embodiment, the battery has a rating of between approximately 100 and 400 mAh. According to another exemplary embodiment, the battery is an approximately 300 mAh battery. According to another exemplary embodiment, the battery is an approximately 75 mAh battery. According to another exemplary embodiment, the battery is an approximately 10 mAh battery.

The battery case or housing (not shown) is formed of a metal or metal alloy such as aluminum or alloys thereof, titanium or alloys thereof, stainless steel, or other suitable materials. According to another exemplary embodiment, the battery case may be made of a plastic material or a plastic-foil laminate material (e.g., an aluminum foil provided intermediate a polyolefin layer and a polyester layer).

An electrolyte is provided intermediate or between the positive and negative electrodes to provide a medium through which lithium ions may travel. The electrolyte may be a liquid (e.g., a lithium salt dissolved in one or more non-aqueous solvents). According to an exemplary embodiment, the electrolyte may be a mixture of ethylene carbonate (EC), ethylmethyl carbonate (EMC) and a 1.0 M salt of $LiPF_6$. According to another exemplary embodiment, an electrolyte may be used that uses constituents that may commonly be used in lithium batteries (e.g., propylene carbonate, dimethyl carbonate, vinylene carbonate, lithium bis-oxalatoborate salt (sometimes referred to as LiBOB), etc.).

Various other electrolytes may be used according to other exemplary embodiments. According to an exemplary embodiment, the electrolyte may be a lithium salt dissolved in a polymeric material such as poly(ethylene oxide) or silicone. According to another exemplary embodiment, the electrolyte may be an ionic liquid such as N-methyl-N-alkylpyrrolidinium bis(trifluoromethanesulfonyl)imide salts. According to another exemplary embodiment, the electrolyte may be a 3:7 mixture of ethylene carbonate to ethylmethyl carbonate (EC:EMC) in a 1.0 M salt of $LiPF_6$. According to another exemplary embodiment, the electrolyte may include a polypropylene carbonate solvent and a lithium bis-oxalatoborate salt. According to other exemplary embodiments, the electrolyte may comprise one or more of a PVDF copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, polyethylene oxide (PEO), a glass ceramic electrolyte, phosphate glasses, lithium conducting glasses, lithium conducting ceramics, and an inorganic ionic liquid gel, among others.

A separator (not shown) is provided intermediate or between the positive electrode 210 and the negative electrode 220. According to an exemplary embodiment, the separator is a polymeric material such as a polypropylene/polyethelene copolymer or another polyolefin multilayer laminate that includes micropores formed therein to allow electrolyte and lithium ions to flow from one side of the separator to the other. The thickness of the separator is between approximately 10 micrometers (μm) and 50 μm according to an exemplary embodiment. According to a particular exemplary embodiment, the thickness of the separator is approximately 25 μm and the average pore size of the separator is between approximately 0.02 μm and 0.1 μm.

The positive electrode 210 includes a current collector 212 made of a conductive material such as a metal. According to an exemplary embodiment, the current collector 212 comprises aluminum or an aluminum alloy.

According to an exemplary embodiment, the thickness of the current collector 212 is between approximately 5 μm and 75 μm. According to a particular exemplary embodiment, the thickness of the current collector 212 is approximately 20 μm. It should also be noted that while the positive current collector 212 has been illustrated and described as being a thin foil material, the positive current collector may have any of a variety of other configurations according to various exemplary embodiments. For example, the positive current collector may be a grid such as a mesh grid, an expanded metal grid, a photochemically etched grid, or the like.

The current collector 212 has a layer of active material 216 provided thereon (e.g., coated on the current collector). While FIG. 2 shows that the active material 216 is provided on only one side of the current collector 212, it should be understood that a layer of active material similar or identical to that shown as active material 216 may be provided or coated on both sides of the current collector 212.

According to an exemplary embodiment, the active material 216 is a material or compound that includes lithium. The lithium included in the active material 216 may be doped and undoped during discharging and charging of the battery, respectively. According to an exemplary embodiment, the active material 216 is lithium cobalt oxide ($LiCoO_2$). According to other exemplary embodiments, the active material may be provided as one or more additional materials. For example, the active material may be $LiMn_2O_4$ or a material having the formula $LiCo_xNi_{(1-x)}O_2$, where x is between approximately 0.05 and 0.8. According to another exemplary embodiment, the active material is a material of the form $LiNi_xCo_yMn_{(1-x-y)}O_2$ (e.g., $LiNi_{1/3}Co_{1/3}Mn_{1/3}O_2$). According to another exemplary embodiment, the active material 216 is a metal-doped variety of one of the aforementioned materials, such as a material of the form $LiM_xCo_yNi_{(1-x-y)}O_2$, where M is aluminum or titanium and x is between approximately 0.05 and 0.3 and y is between approximately 0.1 and 0.3.

For certain applications, it may be desirable to provide a battery having a cell voltage of greater than approximately 3 volts. In such cases, a higher-voltage active material may be utilized on the positive current collector, such as a material in the form $Li_{2-x}Co_yFe_zMn_{4-(y+z)}O_8$ (e.g., $Li_2Co_{0.4}Fe_{0.4}Mn_{3.2}O_8$). It is believed that such an active material may charge up to 5.2 volts versus a lithium reference electrode, making it possible to obtain an overall cell voltage of up to approximately 3.7 volts. Other relatively high-voltage active materials that may be used for the positive electrode include $LiCoPO_4$; $LiNiPO_4$; $Li_2CoPO_4F$; $Li[Ni_{0.2}Li_{0.2}Mn_{0.6}]O_2$; and $LiCo_xMn_{2-x}O_4$ (e.g., $LiCo_{0.3}Mn_{1.7}O_4$).

According to various other exemplary embodiments, the active material may include a material such as a material of the form $Li_{1-x}MO_2$ where M is a metal (e.g., $LiCoO_2$, $LiNiO_2$, and $LiMnO_2$), a material of the form $Li_{1-w}(M'_xM''_y)O_2$ where M' and M'' are different metals (e.g., $Li(Cr_xMn_{1-x})O_2$, $Li(Al_xMn_{1-x})O_2$, $Li(Co_xM_{1-x})O_2$ where M is a metal, $Li(Co_xNi_{1-x})O_2$, and $Li(Co_xFe_{1-x})O_2$)), a material of the form $Li_{1-w}(Mn_xNi_yCo_z)O_2$ (e.g., $Li(Mn_{1/3}Ni_{1/3}Co_{1/3})O_2$, $Li(M_{1/3}Ni_{1/3}Co_{1/3-x}Mg_x)O_2$, $Li(Mn_{0.4}Ni_{0.4}Co_{0.2})O_2$, and $Li(Mn_{0.1}Ni_{0.1}Co_{0.8})O_2$), a material of the form $Li_{1-w}(Mn_xNi_yCo_{1-2x})O_2$, a material of the form $Li_{1-w}(Mn_xNi_yCo_zAl_w)O_2$, a material of the form $Li_{1-w}(Ni_xCo_yAl_z)O_2$ (e.g., $Li(Ni_{0.8}Co_{0.15}Al_{0.05})O_2$), a material of the form $Li_{1-w}(Ni_xCo_yM_z)O_2$ where M is a metal, a material of the form $Li_{1-w}(Ni_xMn_yM_z)O_2$ where M is a metal, a material of the form $Li(Ni_{x-y}Mn_yCr_{2-x})O_4$, $LiMn_2O_4$, a material of the form $LiM'M''_2O_4$ where M' and M'' are different metals (e.g., $LiMn_{2-y-z}Ni_yO_4$, $Li_zO_4$, $LiNiCuO_4$, $LiMn_{1-x}Al_xO_4$, $LiNi_{0.5}Ti_{0.5}O_4$, and $Li_{1.05}Al_{0.1}Mn_{1.85}O_{4-z}F_z$), $Li_2MnO_3$, a material of the form $Li_xV_yO_z$ (e.g., $LiV_3O_8$, $LiV_2O_5$, and $LiV_6O_{13}$), a material of the form $LiMPO_4$ where M is a metal or $LiM_xM''_{1-x}PO_4$ where M' and M'' are different metals (e.g., $LiFePO_4$, $LiFe_xM_{1-x}PO_4$ where M is a metal, $LiVOPO_4$, and $Li_3V_2(PO_4)_3$, and $LiMPO_{4x}$ where M is a metal such as iron or vanadium and X is a halogen such as fluorine, and combinations thereof.

A binder material may also be utilized in conjunction with the layer of active material 216 to bond or hold the various electrode components together. For example, according to an exemplary embodiment, the layer of active material may include a conductive additive such as carbon black and a binder such as polyvinylidine fluoride (PVDF) or an elastomeric polymer.

According to an exemplary embodiment, the thickness of the layer of active material 216 is between approximately 0.1 μm and 3 mm. According to another exemplary embodiment, the thickness of the layer of active material 216 is between approximately 25 μm and 300 μm. According to a particular exemplary embodiment, the thickness of the layer of active material 216 is approximately 75 μm.

The negative electrode 220 includes a current collector 222 that is made of a conductive material such as a metal. According to an exemplary embodiment, the current collector 222 is aluminum or an aluminum alloy. One advantageous feature of utilizing an aluminum or aluminum alloy current collector is that such a material is relatively inexpensive and may be relatively easily formed into a current collector. Other advantageous features of using aluminum or an aluminum alloy includes the fact that such materials may have a relatively low density, are relatively highly conductive, are readily weldable, and are generally commercially available. According to another exemplary embodiment, the current collector 222 is titanium or a titanium alloy. According to another exemplary embodiment, the current collector 222 is silver or a silver alloy.

While the negative current collector 222 has been illustrated and described as being a thin foil material, the negative current collector may have any of a variety of other configurations according to various exemplary embodiments. For example, the positive current collector may be a grid such as a mesh grid, an expanded metal grid, a photochemically etched grid, a metallized polymer film, or the like.

According to an exemplary embodiment, the thickness of the current collector 222 is between approximately 100 nm and 100 μm. According to another exemplary embodiment, the thickness of the current collector 222 is between approximately 5 μm and 25 μm. According to a particular exemplary embodiment, the thickness of the current collector 222 is approximately 10 μm.

Figure 3:
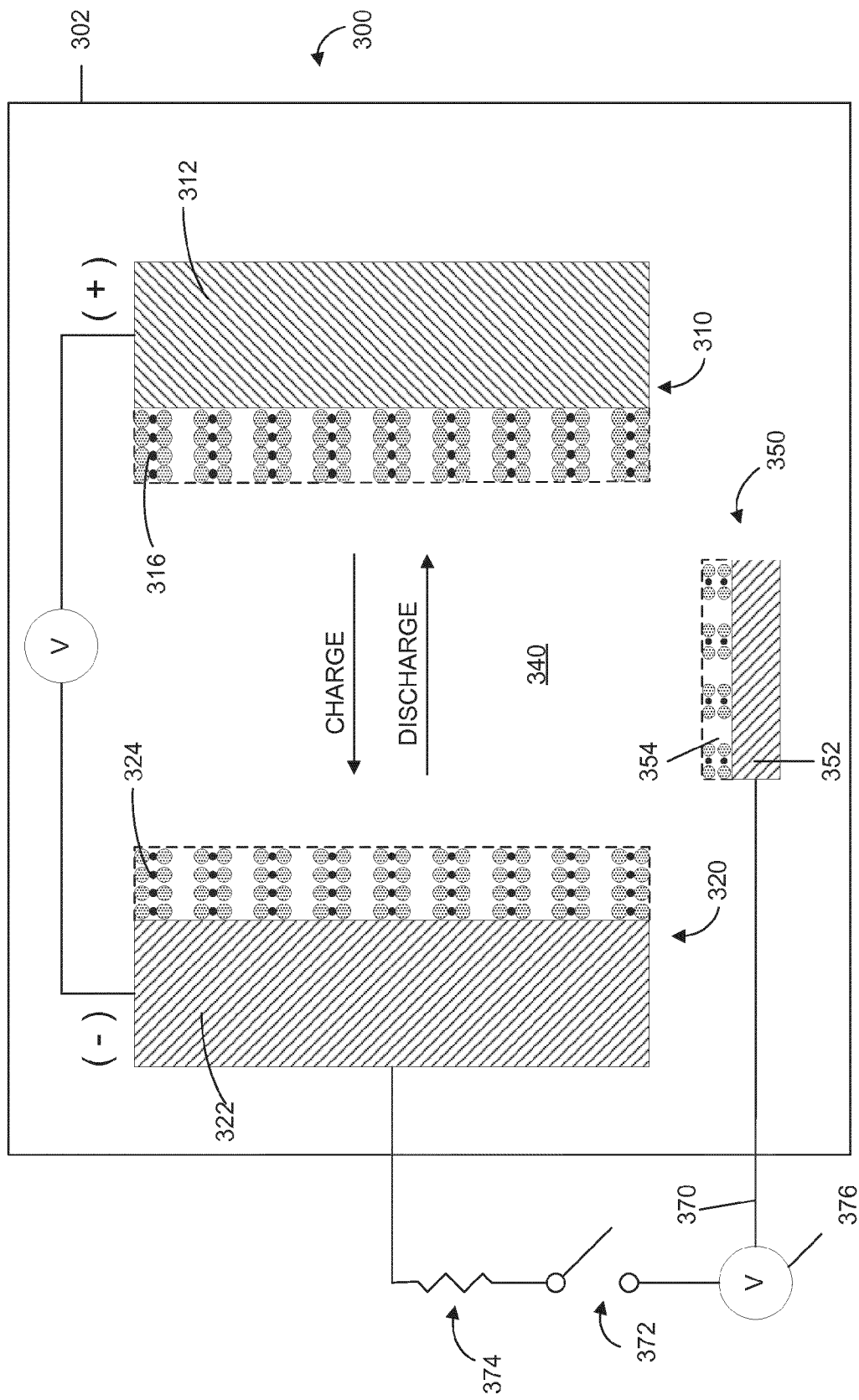
FIG. 3 is a schematic view of a lithium-ion battery according to another exemplary embodiment.

The negative current collector 222 has an active material 224 provided thereon. While FIG. 3 shows that the active material 224 is provided on only one side of the current collector 222, it should be understood that a layer of active material similar or identical to that shown may be provided or coated on both sides of the current collector 222.

According to an exemplary embodiment, the negative active material 224 may be selected from materials having an average potential that is less than or equal to approximately 0.4 V versus Li/Li+ (e.g., between approximately 0.2 V and 0.4 V versus Li/Li+, or less than approximately 0.2 V versus Li/Li+). Various examples are listed in Table 1 below.

TABLE 1

Negative Active Materials

| Class | Compound | Approximate Cycling Potentials (vs Li) | | |
|---|---|---|---|---|
| | | Vmin | Vmax | Vavg |
| Alloys | Alloys comprising of Al, Si or Sn and other elements | | | 0.30 |
| Alloys | Sn—Co—C | | | 0.30 |
| Alloys | Sn—Sb | | | 0.0-1.0 |
| Alloys | Si | | | 0.3 |
| Alloys | Si—C | | | 0.3 |

According to an exemplary embodiment, instead of or in addition to selecting the negative active material 224 according to potential, the negative active material 224 may be selected from materials that consume relatively large amounts of lithium during SEI formation.

According to an exemplary embodiment, instead or in addition to the criteria described above (e.g., potential, lithium consumption), the negative active material 224 may be selected from high surface area powders, which may allow high charge rate and high discharge power, but require additional lithium to form the SEI layer.

According to an exemplary embodiment, instead or in addition to the criteria described above, the negative active material 224 may be selected from high surface area materials, such as high surface area carbonaceous or graphitic negative active materials, high surface area alloys (e.g., Si alloy, or Sn alloy), high surface area oxide based negative active materials (e.g., lithium titanate, hydrogen titanate, and their derivatives). For example, such high surface area materials may have a surface area of approximately 1 $m^2/g$.

According to an exemplary embodiment, instead or in addition to the criteria described above instead or additionally, the negative active material 224 may be selected from materials that form relatively high amounts of SEI due to their surface chemistry or structure. For example, the negative active material 224 may be a non-graphitic carbonaceous material, such as hard carbons, soft carbons, or carbon nanotubes, which generally exhibit greater irreversible capacity than conventional low surface area graphitic anodes.

According to an exemplary embodiment, instead or in addition to the criteria described above instead or additionally, the negative active material 224 may be selected from materials that are susceptible to a relatively high degree volumetric expansion and/or contraction during charge and discharge, which can disrupt the SEI layer. For example, the negative active material 224 may be an alloy, such as Si alloy, Sn alloy, or other suitable alloy material.

A binder material may also be utilized in conjunction with the layer of active material 224. For example, according to an exemplary embodiment, the layer of active material may include a binder such as polyvinylidine fluoride (PVDF) or an elastomeric polymer. The active material 224 may also include a conductive material such as carbon (e.g., carbon black) at weight loadings of between zero and ten percent to provide increased electronic conductivity.

According to various exemplary embodiments, the thickness of the active material 224 is between approximately 0.1 μm and 3 mm. According to other exemplary embodiments, the thickness of the active material 224 may be between approximately 25 μm and 300 μm. According to another exemplary embodiment, the thickness of the active material 224 may be between approximately 20 μm and 90 μm, and according to a particular exemplary embodiment, approximately 75 μm.

According to an exemplary embodiment, the lithium-ion battery 200 includes an auxiliary electrode 250 having a current collector 252 with a lithium source material 254. The auxiliary electrode 250 is configured to selectively couple to the negative electrode 220, such that lithium ions travel from the auxiliary electrode 250 and through the electrolyte 240 to react, for example with decomposing solvents of the electrolyte 240, to generate an SEI layer on the negative electrode 220.

According to an exemplary embodiment, the lithium source material 254 is a material that may supply lithium for SEI generation. According to one exemplary embodiment, the lithium source material 254 is a lithium patch. According to other exemplary embodiments, the lithium source material 254 is another material having a potential versus Li/Li+ that is less than that of the negative active material 224, such as materials used as negative active material in primary lithium batteries, or another suitable material capable of supplying lithium for SEI formation. For example, the lithium source material 254 may be alloys of lithium with other elements, such as Li—Al, Li—Si, Li—Sn, and the like.

As shown in FIG. 3, according to still other exemplary embodiments, a battery 300 includes a lithium source material 354 having a potential versus Li/Li+ that is greater than that of the negative active material 324, such as materials used as positive or negative active materials in lithium batteries, or another suitable material capable of supplying lithium for SEI formation. For example, the lithium source material 354 may positive active materials used for lithium-ion batteries, such as $LiCoO_2$, $LiCo_xNi_{(1-x)}O_2$, and the like. According to those embodiments having a lithium source material 354 with a potential versus Li/Li+ that is greater than that of the negative active material 322, the current collector 352 of the auxiliary electrode 350 may be coupled to the negative electrode 320 by way of a voltage source 376 and a resistance 374. Selective coupling of the voltage source 376 may occur through selective application of the voltage source 376 (e.g., by connecting the voltage source) or by way of a switch 372. The voltage source 376 may be positioned external to the case 302 of the battery 300. According to other exemplary embodiments, the battery 300 and the voltage source 376 cooperatively configured, such that the voltage source 376 is an external device that is configured to be coupled to the auxiliary electrode 350 only during formation or manufacturing of the battery 300 and/or may be configured to be used with multiple batteries 300.

According to an exemplary embodiment, the auxiliary electrode 250 is formed by depositing or otherwise coupling the lithium source material 254 to a current collector 252. For example, according to one exemplary embodiment, the auxiliary electrode 250 is positioned within the case 202 of the battery 200, such that the lithium source material 254 is positioned in contact with the electrolyte, such that when the auxiliary electrode 250 is selectively coupled to the negative electrode 220, the electrolyte acts as a medium through which the lithium ions may travel to the negative electrode 250 for SEI formation. According to other exemplary embodiments, the auxiliary electrode utilizes the case of the battery as a current collector. For example, as shown in FIG.

Figure 4:
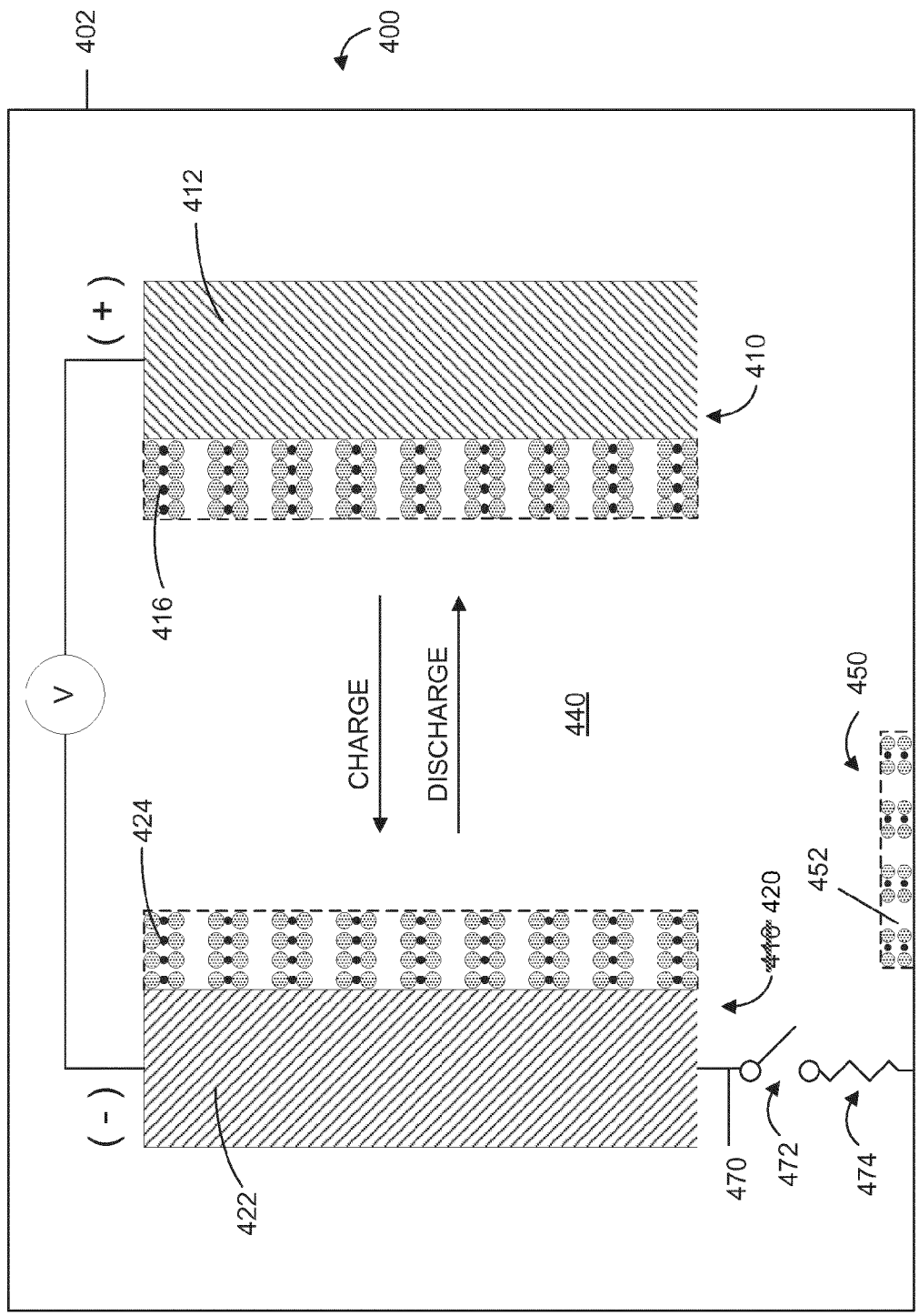
FIG. 4 is a schematic view of a lithium-ion battery according to another exemplary embodiment.
Figure 5:
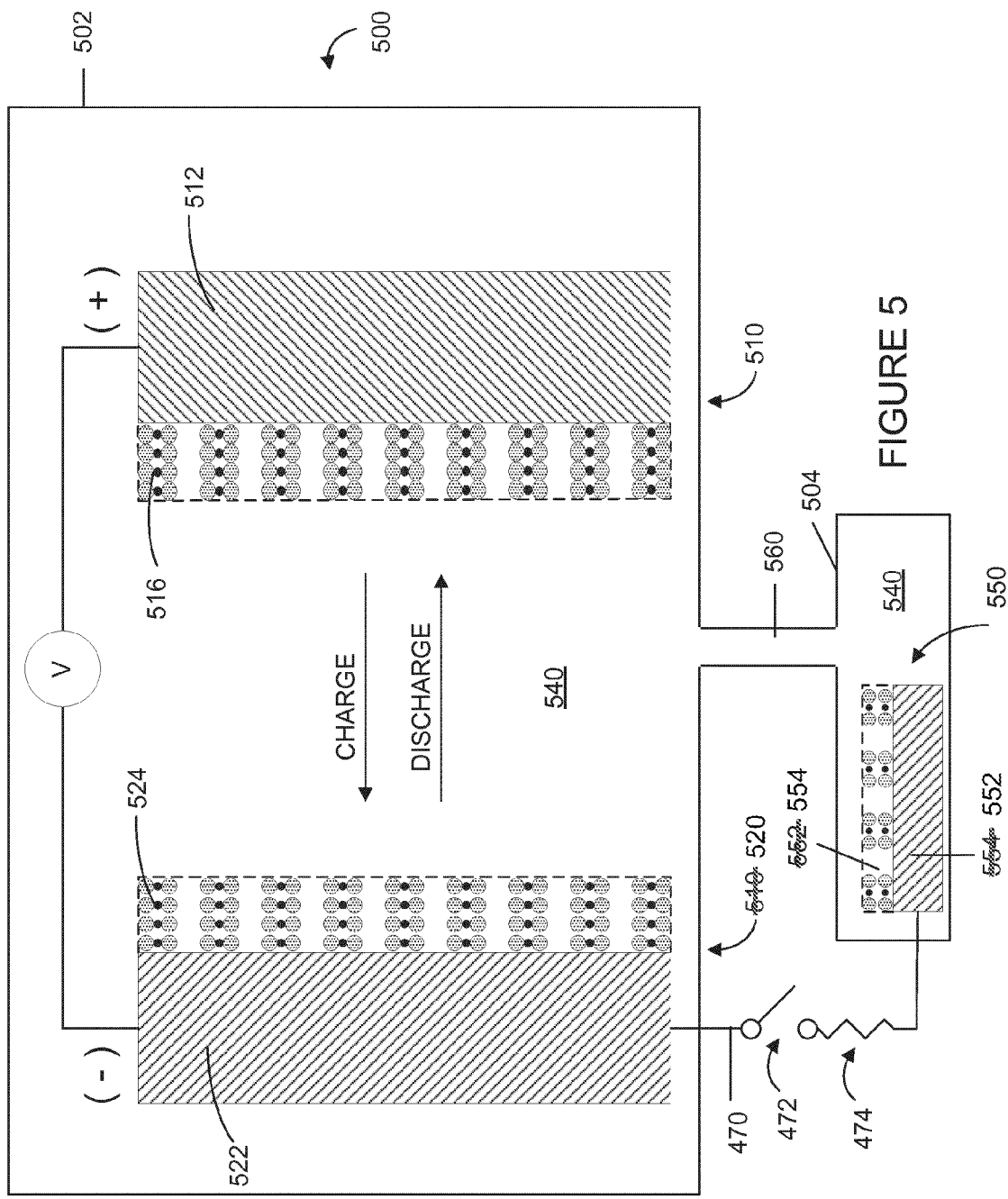
FIG. 5 is a schematic view of a lithium-ion battery according to another exemplary embodiment.

4, an auxiliary electrode 450 may include a lithium source material 454 deposited on portion of a the case 402, which is neutral. In this manner, the lithium source material 454 is disposed inside the case 402 in contact with the electrolyte 440. As another example, an auxiliary electrode 550 may include a lithium source material 554 deposited on a current collector 552, the auxiliary electrode 550 being disposed in a secondary case 504 outside the case 502 of the battery 500 but having the electrolyte 540 in communication through a pass-through, channel, conduit, passage, etc. 560 between the case 502 and secondary case 504. Note that in FIGS. 3-5, all reference numbers are increased by 100, 200, or 300, respectively, for comparable components to those of the battery 200 of FIG. 2.

According to the various exemplary embodiments shown in FIGS. 2-5, the auxiliary electrode is configured to selectively couple to the negative electrode according to various methods and in various manners. While selective coupling is discussed within the context of the exemplary embodiment shown in FIG. 2, the selective coupling may occur in the same or similar manners in other various exemplary embodiments.

The battery (or device in which the battery is installed) may include circuitry configured to couple the auxiliary electrode to the negative electrode and may include a lead, switch, diode, resistance, voltage source, controller, etc. For example, referring to FIG. 2, in embodiments having a lithium source material 254 with a potential versus $Li/Li^+$ that is less than that of the negative active material 224, the current collector 252 of the auxiliary electrode 250 may be coupled to the current collector 224 of the negative electrode 220 by way of a conductor 270 having a switch 272 and a resistance 274. The conductor 270 may be positioned within the case 202 of the battery 200 (as shown), or may be positioned external thereto. Selective coupling may, for example, be controlled according to software that causes the switch to close upon occurrence of various criteria (discussed in further detail below).

According to an exemplary embodiment, the auxiliary electrode 250 and selective coupling of the auxiliary electrode 250 to the negative electrode 220 offer various advantages that include more flexible battery design parameters, selective SEI formation over the course of the useful life of a battery, and more control over the SEI formation process.

For example, because the auxiliary electrode 250 provides a source of lithium for SEI formation other than the positive active material 212, more flexible battery design parameters may apply. That is, because the lithium source material 254 provides at least a portion of the lithium required for SEI formation, less lithium is required from the positive active material 212 and, hence, less positive active material 212 is required for achieving a comparably performing battery 200. Using less positive active material may be beneficial in various ways. First, less positive active material 212 may allow for a thinner positive electrode 210 and, hence, reduce volume and/or mass of the electrode winding or stack. Second, provided the lithium source material 254 is a denser source of lithium than the positive active material (e.g., by volume and/or mass), use of the auxiliary electrode 250 may allow for a smaller and/or lighter battery 200 than could otherwise be achieved for a desired capacity, or could result in a battery 200 of the same size having a higher capacity. Third, because the auxiliary electrode 250 may be provided generally in a non-layered relationship (as is required of the positive electrode 210) and may otherwise be remote from the negative electrode 220 (e.g., by a feed through), greater flexibility in battery geometry (e.g., the physical size, shape, weight distribution) is possible. Fourth, the lithium source material 254 may be a less expensive source of lithium for SEI formation than would be the positive active material 212, thus allowing for a less expensive battery. Additionally, providing a separate lithium source material may allow deviation from common design standards regarding cell balance (i.e., mass deposition ratio of the negative electrode versus the positive electrode) with less positive active material, while still maintaining a desired negative- or positive-limited configuration and target crossing-potential for protection in deep discharge conditions.

Further, because the auxiliary electrode 250 may be selectively coupled to the negative electrode 220 at different times, SEI formation may occur selectively over the course of the useful life of the battery 200. As discussed above, a battery 200 may be formed with a relatively thick SEI layer to protect against cracks and other irregularities that may develop in the SEI layer; however, a thicker SEI layer results in increased resistance of the battery. Advantageously, selective SEI formation enabled by use of the auxiliary electrode 250 may allow for a thinner initial SEI layer (and decreased internal resistance) by enabling controlled SEI formation at a later point.

Also, as discussed above, SEI formation may benefit from occur in a slow, controlled manner (i.e., time or rate of formation, voltage, heat, etc.). By separating SEI formation, at least in part, from initial charging of the battery 200 (i.e., SEI formation with lithium from the positive active material 212), SEI formation can be controlled generally independent of the parameters associated with charging the battery 200 (e.g., limitations of heat, voltage, time, etc.) that might otherwise damage the battery 200).

The foregoing benefits and specific chemistry of each battery 200 in mind, the auxiliary electrode 250 and selective coupling of the auxiliary electrode 250 to the negative electrode 220 may be optimized in various manners. For example, the timing and frequency of selective coupling may occur immediately following initial charging of the battery 200, at predetermined intervals (e.g., monthly, yearly, with each charging), upon detection of various conditions (e.g., number of charging cycles, low voltage conditions, in-service duration, loading patterns, combinations thereof, etc.), upon occurrence of other situations (e.g., a device utilize the battery is accessed for service or repair), suitable combinations thereof, etc. The duration of coupling may be for a predetermined amount of time, an amount of time determined according to detection of various conditions (e.g., number of charging cycles, low voltage conditions, in service duration, loading patterns, temperature, combinations thereof, etc.). Various component parameters may also be optimized, such as resistance (e.g., of the coupling resistance 274), voltage (i.e., of the voltage source if present), current (e.g., computation of the resistance 274 and voltage source), and the lithium source material 254 (e.g., quantity, potential, lithium density, manufacturing characteristics, etc.). Each parameter may, for example, be optimized according to the battery 200 (e.g., voltage, capacity, chemistry, useful life, etc.), as well as expected use of the battery (e.g., duration of expected use, expected number of charge/discharge cycles, accessible or inaccessible location, etc.).

According to an exemplary embodiment, the battery 200 may include a coulometer that is configured to detect coulombic efficiency or charge/discharge capacity of the battery 200. The battery 200 may be configured to couple the auxiliary electrode 250 to the negative electrode 220 according to changes in the coulombic efficiency or charge/discharge capacity, such as when reaching a threshold value (e.g., approximately 15% lost capacity), upon reaching a threshold change (e.g., approximately 1% lost capacity), combinations thereof, and the like. Configured in these manners, the auxiliary electrode 250 may be coupled to the negative electrode 220 to restore higher coulombic efficiency or higher cell capacity.

According to an exemplary embodiment, a method is provided for forming an SEI layer. The method generally includes steps of providing a lithium-ion battery (Step 601), initial charging of the battery (Step 602), coupling the auxiliary electrode to the negative electrode (Step 603), and decoupling the auxiliary electrode from the negative electrode (Step 604). The step of providing a lithium-ion battery (601) includes providing a lithium-ion battery having a positive electrode, a negative electrode, and an auxiliary electrode having a lithium source material, the auxiliary electrode being configured to selectively couple to the negative electrode. The step of initial charging the battery (602) includes coupling the positive electrode to the negative electrode with a voltage source. During the initial charging step, an SEI layer is formed on the negative electrode with lithium from the positive electrode. The step of coupling the auxiliary electrode to the negative electrode (603) includes coupling the auxiliary electrode to the negative electrode with a circuit that may include a switch, resistance, and/or voltage source. During the coupling step, SEI is formed on the negative electrode with lithium from the auxiliary electrode. Further, the step of coupling the auxiliary electrode to the negative electrode (603) may instead, or additionally, occur before or during the charging step (602). The step of decoupling the auxiliary electrode from the negative electrode (604) includes opening the switch or otherwise opening the circuit or breaking the electrical connection between the auxiliary electrode and the negative electrode. Subsequent to decoupling, formation of the SEI layer with lithium from the auxiliary electrode does not occur.

Figure 6:
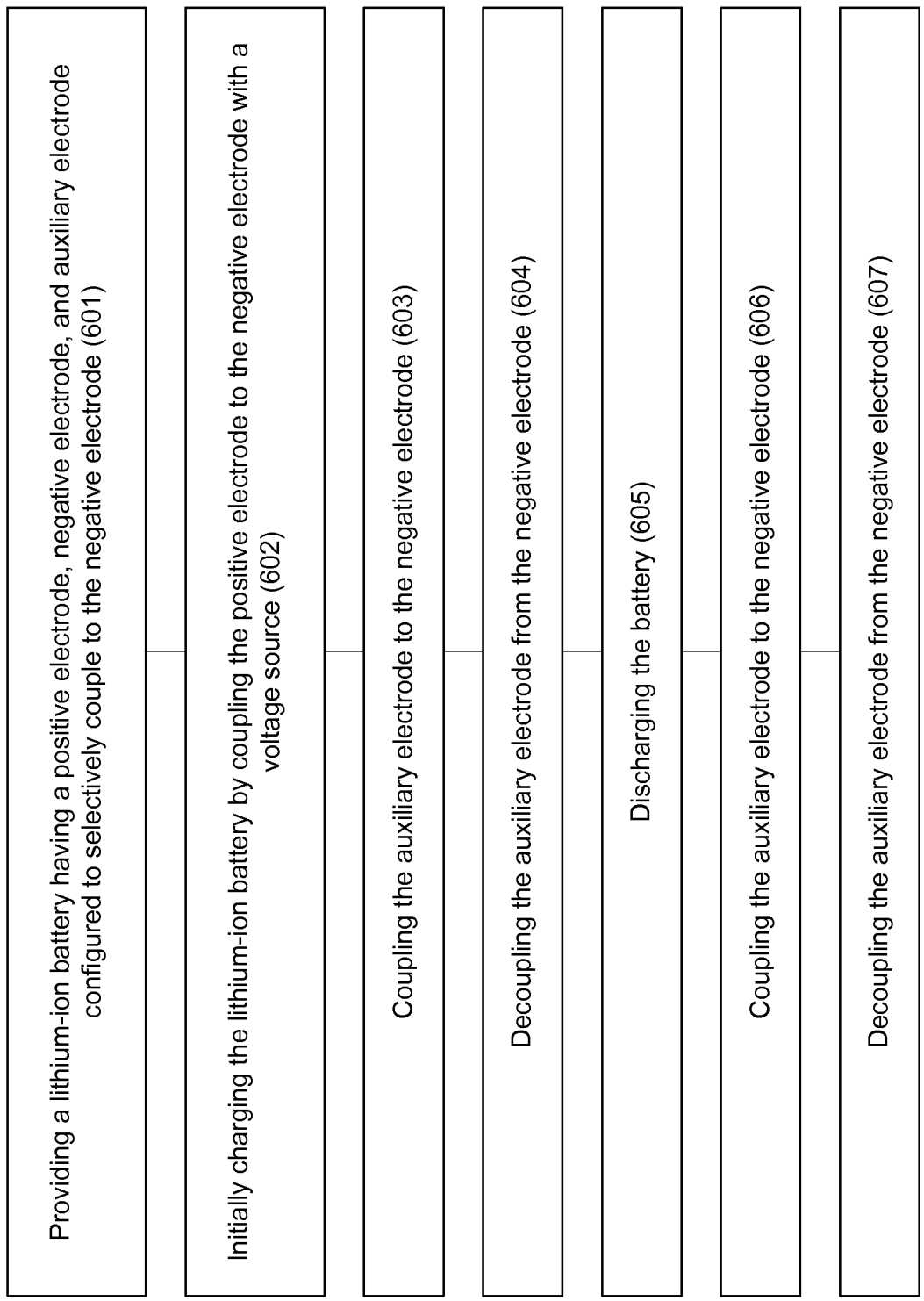
FIG. 6 is a flow diagram illustrating certain steps in a method of forming a solid-electrolyte-inter-phase layer according to an exemplary embodiment.

As shown in FIG. 6, according to an exemplary embodiment, the method of forming an SEI layer may further include steps of discharging the battery (Step 605), coupling the auxiliary electrode to the negative electrode (Step 606), and decoupling the auxiliary electrode from the negative electrode (Step 607). The discharge step (605) generally includes at least partially discharging the battery (e.g., by coupling the positive and negative electrodes to a load, which draws current from the battery and causes lithium ions to transfer from the negative electrode to the positive electrode). The step of subsequently coupling the auxiliary electrode to the negative electrode (606) includes coupling the auxiliary electrode to the negative electrode with the circuit, such that an SEI layer is formed on the negative electrode with additional lithium from the auxiliary electrode. Further, the selective coupling may occur only after discharging the battery (605) (i.e., not perform the coupling (603) prior to discharge), such that the portion of the SEI layer having lithium of the auxiliary electrode if formed only after discharge (604). The step of decoupling the auxiliary electrode from the negative electrode (607) includes opening the switch or otherwise opening the circuit or breaking the electrical connection such that formation of the SEI layer with lithium from the auxiliary electrode does not occur.

According to various exemplary embodiments, the auxiliary electrode 250 is coupled to the negative electrode 220 prior to use of the battery 200. For example, the battery 200 may be charged until reaching a desired cutoff voltage (e.g., approximately 4.1 V), and immediately thereafter or prior to use of the battery 200, the auxiliary electrode 250 is coupled to the negative electrode 220 until the negative electrode 220 reaches a desired cutoff voltage (e.g., 0.05 V versus $Li/Li^+$). According to another exemplary embodiment, the battery 200 is charged until reaching a desired cutoff voltage, and immediately after charging or prior to use of the battery 200, the auxiliary electrode 250 is coupled to the negative electrode 220 until a capacity or amount of lithium approximately equivalent to the known or predicted irreversible capacity of the negative electrode 220 is delivered (e.g., approximately 15% of the negative capacity). According to another exemplary embodiment, the auxiliary electrode 250 is coupled to the negative electrode 220 until capacity or amount of lithium approximately equivalent to the known or predicted irreversible capacity of the negative electrode 220 is delivered (e.g., approximately 15% of the negative capacity), and subsequently, the battery 200 is charged until the cell reaches a desired cutoff voltage.

According to various exemplary embodiments, the auxiliary electrode 250 is coupled to the negative electrode 220 after use of the battery (i.e., for later stage SEI formation). For example, the auxiliary electrode 250 may be coupled to the negative electrode 220 for a duration sufficient to deliver a known or predicted amount of capacity or lithium that has been lost (e.g., approximately 1% of negative capacity). Coupling may occur at a measured duration from since a first discharge cycle (e.g., one year), at weekly/monthly/annual intervals, or upon occurrence or detection of certain conditions, such as 50 charge/discharge cycles, 10% lost capacity, etc. Criteria, such as time, discharge cycles, etc. that have predictable effects on the SEI may be particularly suited for determining if and when to couple the auxiliary electrode when degradation of the SEI is more predictable (e.g., with Si alloy negative active materials that may be susceptible to degradation of the SEI from expansion/contraction).

Figure 7:
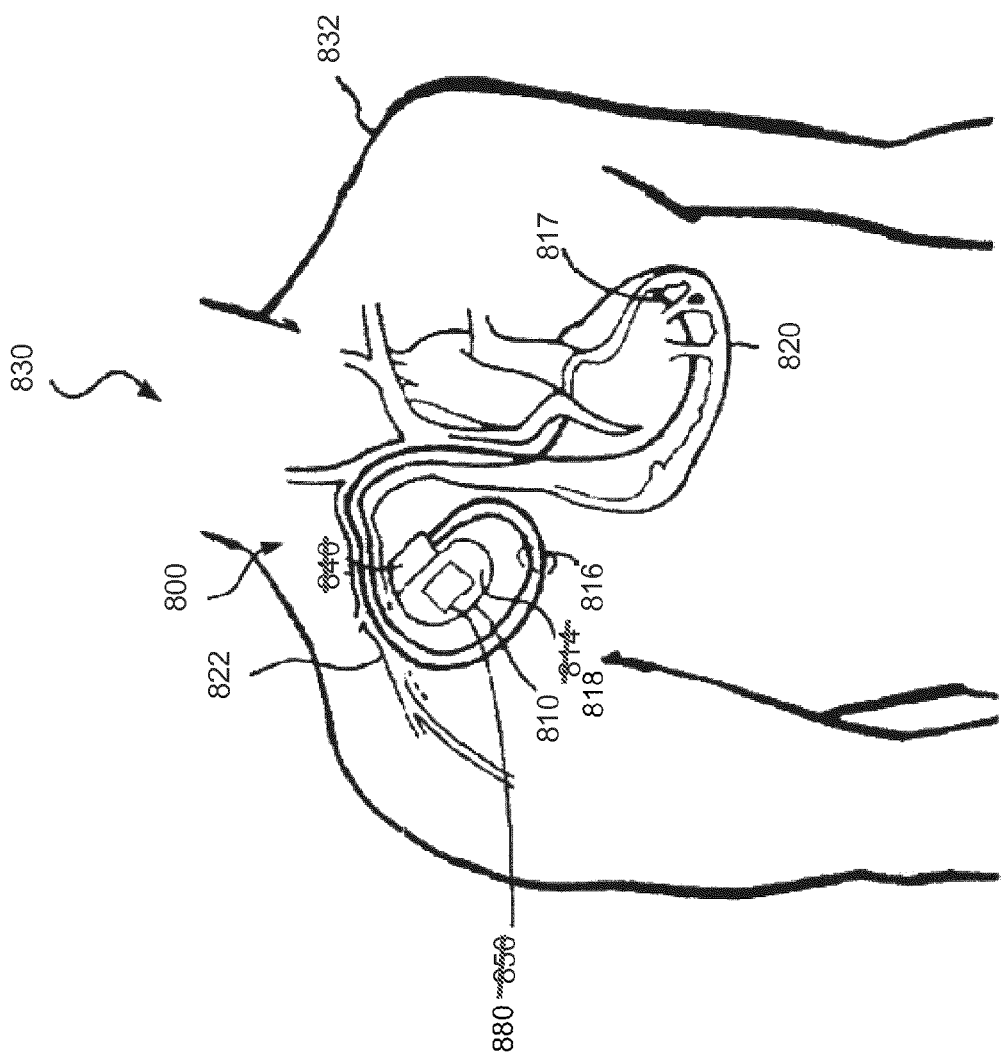
FIG. 7 is a schematic view of a system in the form of an implantable medical device implanted within a body or torso of a patient including a lithium-ion battery according to an exemplary embodiment.

The batteries and formation methods described in the present application may find utility in a variety of applications, including in implantable medical devices (IMDs). FIG. 7 illustrates a schematic view of a system 800 (e.g., an implantable medical device) implanted within a body or torso 832 of a patient 830. The system 800 includes a device 810 in the form of an implantable medical device that for purposes of illustration is shown as a defibrillator configured to provide a therapeutic high voltage (e.g., 700 volt) treatment for the patient 830.

The device 810 includes a container or housing 818 that is hermetically sealed and biologically inert according to an exemplary embodiment. The container may be made of a conductive material. One or more leads 816 electrically connect the device 810 and to the patient's heart 820 via a vein 822. Electrodes 817 are provided to sense cardiac activity and/or provide an electrical potential to the heart 820. At least a portion of the leads 816 (e.g., an end portion of the leads shown as exposed electrodes 817) may be provided adjacent or in contact with one or more of a ventricle and an atrium of the heart 820.

The device 810 includes a battery 880 according to an exemplary embodiment provided therein to provide power for the device 810. The size and capacity of the battery 880 may be chosen based on a number of factors, including the amount of charge required for a given patient's physical or medical characteristics, the size or configuration of the device, and any of a variety of other factors. According to an exemplary embodiment, the battery is a 5 mAh battery. According to another exemplary embodiment, the battery is a 300 mAh battery. According to various other exemplary embodiments, the battery may have a capacity of between approximately 1 and 1000 mAh.

According to other exemplary embodiments, more than one battery may be provided to power the device 810. In such exemplary embodiments, the batteries may have the same capacity or one or more of the batteries may have a higher or lower capacity than the other battery or batteries. For example, according to an exemplary embodiment, one of the batteries may have a capacity of approximately 500 mAh while another of the batteries may have a capacity of approximately 75 mAh.

According to an exemplary embodiment, the battery may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

Figure 8:
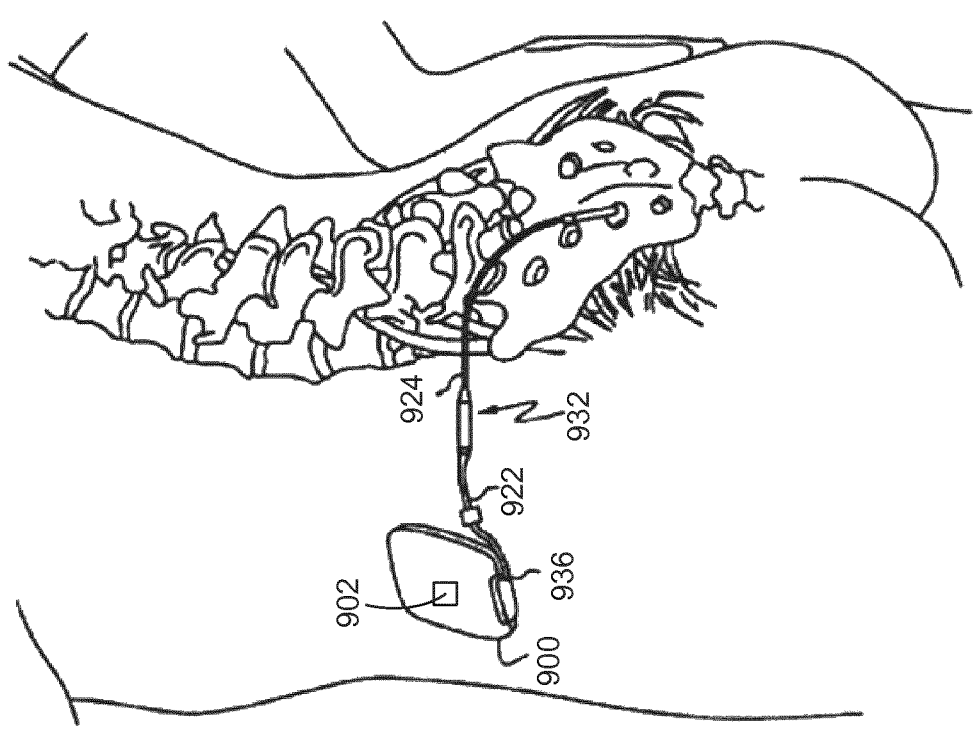
FIG. 8 is a schematic view of another system in the form of an implantable medical device including a lithium-ion battery according to an exemplary embodiment.

According to another exemplary embodiment shown in FIG. 8, an implantable neurological stimulation device 900 (an implantable neuro stimulator or INS) may include a battery 902 such as those described above with respect to the various exemplary embodiments. Examples of some neuro stimulation products and related components are shown and described in a brochure titled "Implantable Neurostimulation Systems" available from Medtronic, Inc.

An INS generates one or more electrical stimulation signals that are used to influence the human nervous system or organs. Electrical contacts carried on the distal end of a lead are placed at the desired stimulation site such as the spine or brain and the proximal end of the lead is connected to the INS. The INS is then surgically implanted into an individual such as into a subcutaneous pocket in the abdomen, pectoral region, or upper buttocks area. A clinician programs the INS with a therapy using a programmer. The therapy configures parameters of the stimulation signal for the specific patient's therapy. An INS can be used to treat conditions such as pain, incontinence, movement disorders such as epilepsy and Parkinson's disease, and sleep apnea. Additional therapies appear promising to treat a variety of physiological, psychological, and emotional conditions. Before an INS is implanted to deliver a therapy, an external screener that replicates some or all of the INS functions is typically connected to the patient to evaluate the efficacy of the proposed therapy.

The INS 900 includes a lead extension 922 and a stimulation lead 924. The stimulation lead 924 is one or more insulated electrical conductors with a connector 932 on the proximal end and electrical contacts (not shown) on the distal end. Some stimulation leads are designed to be inserted into a patient percutaneously, such as the Model 3487A Pisces-Quad® lead available from Medtronic, Inc. of Minneapolis Minn., and stimulation some leads are designed to be surgically implanted, such as the Model 3998 Specify® lead also available from Medtronic.

Although the lead connector 932 can be connected directly to the INS 900 (e.g., at a point 936), typically the lead connector 932 is connected to a lead extension 922. The lead extension 922, such as a Model 7495 available from Medtronic, is then connected to the INS 900.

Implantation of an INS 900 typically begins with implantation of at least one stimulation lead 924, usually while the patient is under a local anesthetic. The stimulation lead 924 can either be percutaneously or surgically implanted. Once the stimulation lead 924 has been implanted and positioned, the stimulation lead's 924 distal end is typically anchored into position to minimize movement of the stimulation lead 924 after implantation. The stimulation lead's 924 proximal end can be configured to connect to a lead extension 922.

The INS 900 is programmed with a therapy and the therapy is often modified to optimize the therapy for the patient (i.e., the INS may be programmed with a plurality of programs or therapies such that an appropriate therapy may be administered in a given situation).

A physician programmer and a patient programmer (not shown) may also be provided to allow a physician or a patient to control the administration of various therapies. A physician programmer, also known as a console programmer, uses telemetry to communicate with the implanted INS 900, so a clinician can program and manage a patient's therapy stored in the INS 900, troubleshoot the patient's INS system, and/or collect data. An example of a physician programmer is a Model 7432 Console Programmer available from Medtronic. A patient programmer also uses telemetry to communicate with the INS 900, so the patient can manage some aspects of her therapy as defined by the clinician. An example of a patient programmer is a Model 7434 Itrel® 3 EZ Patient Programmer available from Medtronic.

According to an exemplary embodiment, a battery provided as part of the INS 900 may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

While the medical devices described herein (e.g., systems 800 and 900) are shown and described as a defibrillator and a neurological stimulation device, it should be appreciated that other types of implantable medical devices may be utilized according to other exemplary embodiments, such as pacemakers, cardioverters, cardiac contractility modules, drug administering devices, diagnostic recorders, cochlear implants, and the like for alleviating the adverse effects of various health ailments.

It is also contemplated that the medical devices described herein may be charged or recharged when the medical device is implanted within a patient. That is, according to an exemplary embodiment, there is no need to disconnect or remove the medical device from the patient in order to charge or recharge the medical device.

It is important to note that the construction and arrangement of the batteries and cells and the methods for forming such batteries as shown and described in the various exemplary embodiments is illustrative only. Although only a few embodiments have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to other exemplary embodiments. Other substitutions, modifications, changes, and omissions may be made in the design, operating conditions, and arrangement of the various exemplary embodiments without departing from the scope of the present inventions as expressed in the appended claims.

What is claimed is:

1. A method for forming a solid electrolyte interface in a lithium-ion battery comprising:
    providing a lithium-ion battery having a positive electrode, a negative electrode, and an auxiliary electrode having a lithium source material, the electrodes being in contact with a common electrolyte;
    charging the battery by coupling the positive electrode to the negative electrode with a voltage source, such that lithium from the positive electrode forms at least a portion of a solid electrolyte interface on the negative electrode;
    after charging the battery, selectively coupling the auxiliary electrode to the negative electrode for a first predetermined time, such that lithium from the auxiliary electrode forms another portion of the solid electrolyte interface on the negative electrode; and
    uncoupling the auxiliary electrode from the negative electrode.

2. The method of claim 1, wherein coupling of the auxiliary electrode to the negative electrode occurs during a formation process of the battery prior to an initial discharge of the battery.

3. The method of claim 1, wherein coupling of the auxiliary electrode to the negative electrode occurs after an initial discharge of the battery.

4. The method of claim 3, wherein coupling of the auxiliary electrode to the negative electrode is configured to occur at regular intervals.

5. The method of claim 1, wherein coupling of the auxiliary electrode to the negative electrode occurs prior to charging the battery.

6. The method of claim 1, wherein coupling of the auxiliary electrode to the negative electrode includes coupling a voltage source to the negative electrode and the auxiliary electrode.

7. The method of claim 1, wherein coupling of the auxiliary electrode to the negative electrode includes coupling a resistance to the negative electrode and the auxiliary electrode.

8. The method of claim 1, further comprising:
    recoupling the auxiliary electrode to the negative electrode after an initial discharge of the battery for a second predetermined time, such that while the auxiliary electrode is coupled to the negative electrode, additional lithium from the auxiliary electrode forms another portion of the solid electrolyte interface on the negative electrode; and
    uncoupling the auxiliary electrode from the negative electrode.

9. The method of claim 1, wherein the auxiliary electrode comprises a lithium source material.

10. The method of claim 7, wherein a cycling potential of the auxiliary electrode is less than that of the negative electrode.

11. The method of claim 1, wherein the negative electrode comprises an active material negative active material selected from the group consisting of a tin alloy and a silicon alloy.

12. The method of claim 1, wherein the auxiliary electrode includes a lithium source of material that is a denser source of lithium than a positive active material of the positive electrode.

13. The method of claim 1, wherein the first predetermined time is configured to allow an amount of lithium approximately equivalent to 15% of a negative capacity of the negative electrode to be delivered from the auxiliary electrode to the negative electrode.

14. The method of claim 8, wherein the recoupling is initiated in response to occurrence of a predetermined condition of the lithium-ion battery.

15. The method of claim 14, wherein the predetermined condition comprises at least one of passage of a predetermined time period, a predetermined number of charge cycles, a predetermined number of discharge cycles, and a predetermined loss of capacity.

16. The method of claim 8, wherein the second predetermined time is configured to allow an amount of lithium approximately equivalent to 1% of a negative capacity of the negative electrode to be delivered from the auxiliary electrode to the negative electrode.

* * * * *